United States Patent
Zhu

(10) Patent No.: US 7,848,982 B2
(45) Date of Patent: Dec. 7, 2010

(54) METHOD AND SYSTEM OF AGGREGATING CONSIDERATION ASSOCIATED WITH A REQUEST

(75) Inventor: Jiafeng Zhu, 500 Revival Ter., Fremont, CA (US) 94536

(73) Assignee: Jiafeng Zhu, San Ramon, CA (US)

( * ) Notice: Subject to any disclaimer, the term of this patent is extended or adjusted under 35 U.S.C. 154(b) by 0 days.

(21) Appl. No.: 11/950,072

(22) Filed: Dec. 4, 2007

(65) Prior Publication Data
US 2009/0144192 A1    Jun. 4, 2009

(51) Int. Cl.
*G06Q 40/00* (2006.01)

(52) U.S. Cl. .............................. 705/35; 705/8; 705/12; 705/14.16

(58) Field of Classification Search .................. None
See application file for complete search history.

(56) References Cited

U.S. PATENT DOCUMENTS 6,064,986 A *   5/2000   Edelman .................... 705/36 R
6,526,404 B1*   2/2003   Slater et al. ................... 707/5
2006/0165060 A1*   7/2006   Dua ............................ 370/352

OTHER PUBLICATIONS

Business Wire. BizBuyer.com Introduces Highly Sophisticated RFQ Purchasing Solution for Business Services. Business Editors/High-Tech Writers. New York: Jun. 6, 2000. p. 1.*
PR Newswire. Sybase and Global Card Services Helping the Travel Industry Manage Credit Card Transactions Online. New York: Jun. 26, 2001. p. 1.*

* cited by examiner

*Primary Examiner*—Alexander Kalinowski
*Assistant Examiner*—Muriel Tinkler
(74) *Attorney, Agent, or Firm*—Raj Abhyanker, P.C.

(57) ABSTRACT

A method, apparatus and system of method and system of aggregating consideration associated with a request is disclosed. In one embodiment, a method includes generating a request (e.g., may include a performance request, an article request, a mission and/or an altruistic request) of an entity based on a set of parameters provided by an initiating patron of the entity, allocating an initial consideration to the request from the initiating patron, generating a profile of the request having the initial consideration in a request aggregation environment and allocating, to the initial consideration, an additional consideration provided when a different patron contributes the additional consideration to the request. The method may include determining whether contact information of the entity provided by the initiating patron and the different patron references to a verified contact data and communicating the request to the entity based on the contact information and the verified contact data.

12 Claims, 21 Drawing Sheets

| REQUEST ID 302 | REQUEST TITLE 304 | TASK 306 | TOTAL CONSIDERATION 308 | INITIATOR 310 | ENTITY 312 | REQUEST CLOSE DEADLINE 314 | NUMBER OF PATRONS 316 | TYPE (PUBLIC/PRIVATE) 318 | CATEGORY 320 |
|---|---|---|---|---|---|---|---|---|---|
| 1001 | QUESTION BOB SMITH | QUESTION | $70000 | MICHAEL LEE | BOB SMITH | 7/1/2008 | 1000 | PUBLIC | SPORTS |
| • | • | • | • | • | • | • | • | • | • |
| • | • | • | • | • | • | • | • | • | • |
| • | • | • | • | • | • | • | • | • | • |

350

MIKE SMITH IS REQUIRED TO ANSWER QUESTIONS

| | | |
|---|---|---|
| REQUEST ID: | A101145 | ~ 600 |
| INITIATOR: | CHRIS BOB | ~ 602 |
| CONSIDERATION SIZE: | US $100 ~ 604 | |
| TOTAL REQUEST MEMBERS: | 21 ~ 606 | |
| MINIMAL CONTRIBUTE UNIT: | US $1 ~ 608 | |
| ACCEPTING DEADLINE: | END AT AUGUST 10 2008 11:55AM (PDT) ~ 610 | |
| ALLOW ADDITIONAL TASKS: | YES ~ 612 | |
| ALLOW FULFILL LESS TASKS: | YES ~ 614 | |
| TASK DEADLINE: | BEFORE AUGUST 5 2007 11:55 AM (PDT) ~ 616 | |
| FULFILL DEADLINE: | 5 DAYS AFTER ACCEPT ~ 618 | |
| VERIFICATION METHOD: | VERIFY BY VOTE BY OFFER MEMBERS, >50% PASS AS VERIFIED ~ 620 | |
| REDO ALLOW: | 1 TIME | ~ 622 |

TASKS:

TASK 1: MIKE SMITH IS REQUIRED TO ANSWER THE FOLLOWING QUESTION DETAIL DESCRIPTIONS...

TASK 2: MIKE SMITH IS REQUIRED TO ANSWER THE FOLLOWING QUESTION DETAIL DESCRIPTIONS...

FIGURE 6A  ~ 650A

CHRIS BOB REQUEST COMMUNITY

REQUEST ~ 630

1. MIKE SMITH TO PERFORM CONCERT
2. JERRY TO SHOW MIND GAMES
3. MARK TO TRAIN STRATEGY
4. SUSAN FOR FASHION ADVICE

MIKE SMITH TO PERFORM CONCERT

| | |
|---|---|
| REQUEST ID: | A101145 |
| CONSIDERATION SIZE: | US $100 |
| PARTICIPATE REQUEST USERS: | 21 |
| MINIMAL CONTRIBUTE UNIT: | US $1 |
| ACCEPTING DEADLINE: | END AT AUGUST 10 2008 11:55AM (PDT) |
| TASK DEADLINE: | BEFORE AUGUST 5 2007 11:55 AM (PDT) |
| FULFILL DEADLINE: | 5 DAYS AFTER ACCEPT |
| TYPE OF REQUEST | PUBLIC ~ 632 |
| VERIFICATION: | NO ~ 634 |
| MY CONSIDERATION: | [_____] ~ 636 |

TASKS: ~ 638

TASK 1:

[ ENTER ]  [ CLEAR ]  [ SUBMIT ]

TASK 2:

[ ENTER ]  [ CLEAR ]  [ SUBMIT ]

[ ADD MORE TASKS ] ~ 640

FIGURE 6B          ~ 650B

SELECT A VERIFICATION METHOD

○ VERIFY BY INITIATOR ONLY ~702

○ VERIFY BY THIRD PARTY ~704

THIRD PARTY NAME   [          ]
    THIRD PARTY EMAIL   [         ]
    THIRD PARTY ADDRESS [         ]

○ VERIFY BY VOTE
    ○ ONE VOTE PER MONEY POOL MEMBER
    ○ ONE VOTE PER DOLLAR OF MONEY POOL MEMBER ~706
    VOTE THRESHOLD [      ]

PATRON ~ 906A

OPEN OFFERS ~ 902A

| RESPONDER | TITLE | TOTAL MONEY POOL | PARTICIPATE MEMBERS | ENDING TIME | ADD MONEY | ADD TASK | VERIFY |
|---|---|---|---|---|---|---|---|
| JOE SMITH | JOE SMITH IS REQUIRED TO PERFORM SING A SONG | $999 | 100 | 30 DAYS, 11 HOURS, 5 MINUTES | ADD $ | O | O |
| MIKE YOUNG | MIKE YOUNG IS REQUIRED TO ANSWER QUESTIONS | $919 | 201 | 3 DAYS, 11 HOURS, 15 MINUTES | ADD $ | O | O |
| ANN ROB | ANN ROB IS REQUIRED TO DO AN ONLINE INTERVIEW | $99 | 10 | 4 DAYS, 1 HOURS, 5 MINUTES | CLOSED | O | O |

OFFER HISTORY ~ 904A

| RESPONDER | TITLE | TOTAL MONEY POOL | PARTICIPATE MEMBERS | ENDING TIME | STATUS | VIEW RESULTS |
|---|---|---|---|---|---|---|
| PETER JOE | PETER JOE IS REQUIRED TO PERFORM SING A SONG | $999 | 100 | JULY 30TH 2007 11:08AM (PDT) | REFUND | O |
| MARY RICE | MARY RICE IS REQUIRED TO ANSWER QUESTIONS | $919 | 201 | JUNE 2ND 2007 5:09AM (PDT) | PAID | O |

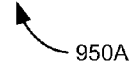
950A

FIGURE 9A

ENTITY ~ 906B

OPEN OFFERS ~ 902B

| TITLE | TOTAL MONEY POOL | PARTICIPATE MEMBERS | ENDING TIME | SET ACCEPT THRESHOLD | ACCEPT | FULFILL | SELECT PAYMENT METHOD |
|---|---|---|---|---|---|---|---|
| JOHN SMITH IS REQUIRED TO PERFORM SING A SONG | $999 | 100 | 30 DAYS, 11 HOURS, 5 MINUTES | $ ☐<br>○ VISIBLE | ○ | ○ | ○ |
| JOHN SMITH IS REQUIRED TO ANSWER QUESTIONS | $419 | 201 | 3 DAYS, 11 HOURS, 15 MINUTES | $ ☐<br>● VISIBLE | ○ | ○ | ○ |
| JOHN SMITH IS REQUIRED TO DO AN ONLINE INTERVIEW | $750 | 500 | 4 DAYS, 1 HOURS, 5 MINUTES | ACCEPTED | ○ | ○ | ○ |
| JOHN SMITH IS REQUIRED TO DO AN ONLINE INTERVIEW | $999 | 889 | 4 DAYS, 1 HOURS, 5 MINUTES | ACCEPTED | ○ | ○ | ○ |

OFFER HISTORY ~ 904B

| TITLE | TOTAL MONEY POOL | PARTICIPATE MEMBERS | ENDING TIME | STATUS | VIEW RESULTS |
|---|---|---|---|---|---|
| JOHN SMITH IS REQUIRED TO PERFORM SING A SONG | $99 | 10 | JULY 30TH 2007 11:08AM (PDT) | REFUND | ○ |
| JOHN SMITH IS REQUIRED TO ANSWER QUESTIONS | $929 | 203 | JUNE 2ND 2007 5:09AM (PDT) | PAID | ○ |

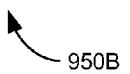
950B

FIGURE 9B

| ENTITY | REQUEST TITLE | CONSIDERATION | PARTICIPATE USER | ACCEPTING DEADLINE |
|---|---|---|---|---|
| JOHN SMITH | JOHN SMITH IS REQUIRED TO PERFORM SING A SONG | $999,000 | 10001 | 30 DAYS, 11 HOURS, 5 MINUTES |
| MIKE YOUNG | MIKE YOUNG IS REQUIRED TO ANSWER QUESTIONS | $919,000 | 22001 | 3 DAYS, 11 HOURS, 15 MINUTES |
| ANN ROB | ANN ROB IS REQUIRED TO DO AN ONLINE INTERVIEW | $99,000 | 1000 | 4 DAYS, 11 HOURS, 5 MINUTES |
|  |  |  |  |  |

TOP CONSIDERATION POOL ▼ 10 ▼ ALL CATEGORIES ▼ (BROWSE)

METHOD AND SYSTEM OF AGGREGATING CONSIDERATION ASSOCIATED WITH A REQUEST

FIELD OF TECHNOLOGY

This disclosure relates generally to the technical fields of software and database technology and, in one example embodiment, to a method and system of aggregating consideration associated with a request.

BACKGROUND

An entity (e.g., an individual, a business, an organization, etc.) may achieve sufficient recognition (e.g., reputation, ranking, frame among a targeted audience, etc.) that demands on their time are constrained by the number of hours in a day. A patron (e.g., a follower, an observer, a fan, an employee, a family member etc.) of the entity may desire to communicate a request to the entity. For example, the patron (e.g., may be a person who supports the entity with money, gifts, efforts, and/or endorsements, etc.) may wish for the entity (e.g., may be an artist, writer, museum, cause, charity, institution, special event, etc.) to perform an activity with them (e.g., share a meal), prepare an article for them (e.g., write a letter, draw a picture, create a sculpture, etc.), undertake a performance for them (e.g., video record a message), and/or achieve a desired goal (e.g., reduce pollution in automobiles), etc.

The patron may not have access to the entity because the patron may not have personal contacts to submit the request. Even when the request is submitted (e.g., through postal mail and/or through a website of the entity), the request may not be responded to because it may be difficult for the entity to determine a value and priority of the request in light of opportunities and/or requests submitted by others. For example, the entity may be inundated with requests submitted through a variety of offline (e.g., postal mail, face to face, etc.) and/or online means (e.g., a website of the entity).

Furthermore, the patron may not be able to provide sufficient consideration (e.g., something of value provided by the patron to the entity, such as money, goods, services, etc.) that would make the request a compelling candidate for response. As a result, the entity may miss out on considering compelling requests because fewer requests may be submitted.

SUMMARY

A method and system of aggregating consideration associated with a request is disclosed. In one aspect, a method includes generating a request (e.g., a performance request, a task request, a job request, an article request, a charitable request, an interview, a question to answer, an invitation, a self promotion, a donation request, a mission and/or an altruistic request, etc.) of an entity (e.g., an individual, a group, a business, a celebrity and/or an organization, etc.) based on a set of parameters provided by an initiating patron of the entity (e.g., a requester), allocating an initial consideration to the request from the initiating patron, generating a profile of the request having the initial consideration in a request aggregation environment, and allocating, to the initial consideration, an additional consideration provided when a different patron (e.g., a supporter of the request) contributes the additional consideration to the request.

In addition, the method may include determining whether a contact information of the entity provided by at least one of the initiating patron and the different patron references to a verified contact data, and communicating the request to the entity based on the contact information and/or the verified contact data. The method may also include validating the contact information with the entity when the verified contact data is absent, and storing the contact data as the verified contact data.

The method may include generating a summary view of the request and other requests when the initial consideration and the additional consideration reach an acceptable value set by the entity. The method may include processing a response of the entity to the request and providing a verification interface to the initiating patron and the different patron. The method may also include determining the initial consideration and the additional consideration through an account funded through a subscription service and/or a trusted financial intermediary. Furthermore, the method may include allocating the initial consideration and the additional consideration to the entity based on an initiating patron specified criteria provided by the initiating patron prior to the response of the entity to the request.

The method may further include setting the criteria as of a weighted preference based on consideration provided to the request, and/or an equal preference based on a number of patrons providing any consideration to the request. The method may store a voting record in the profile of the initiating patron and the different patron. In addition, the method may include arbitrating disputes between patrons and the entity through the verification interface by involving a neutral third party in the verification interface. The method may also include automatically accepting the request on behalf of the entity when the threshold value is exceeded. A service fee may be allocated to the request aggregation environment when the response is accepted through the verification interface.

In addition, the method may include providing a refund to the initiating patron and the different patron when the response is rejected through the verification interface after applying the service fee. The method may permit a partial fulfillment and redoing of the request by the entity when the initiating patron permits. The method may include designating where the initial consideration and the additional consideration is to be allocated based on a preference of the entity. The method may enable the initiating patron and the different patron to provide to the entity a feedback to the response.

The method may further include enabling the initiating patron and the different patron to create and submit multiple requests to the entity and grouping the request and the multiple requests in categories searchable in any number of dimensions. The method may enable the initiating patron and the different patron to allocate tasks to the request based on a set of permissions authorized by the initiating patron.

In addition, the method may include setting a minimum pledge amount and a set of deadlines (e.g., may include a first deadline to provide the additional consideration, a second deadline to add additional requests when the initiating patron provides for this ability, a third deadline to accept the request and/or a fourth deadline to fulfill the request after accepting) to the request based on the set of permissions. The method may accept additional information associated with the request and a response to the request by the entity in any multimedia format.

The method may further include enabling patrons to designate and search at least one interest in profiles of the patrons. The method may share a historical record of requests of each patron with other users of the request aggregation environment through their profiles. In addition, the method may include customizing a set of requests individually displayed to the patrons based on the interest provided in the profiles of the patrons. The method may form a group of patrons (e.g., may be a private group accessible only by invitees and/or a public group that can be subscribed to by any user). The method may also include enabling the initiating patron to submit a private request to the entity such the private request is shared only among invitees and the entity. The method may mask an identity of the initiating patron associated with the private request from the entity.

The method may further include allocating a copyright interest in the request and a response to the request by the entity to the request aggregation environment based on an assignment agreement between the initiating patron, the different patron and/or the entity with the request aggregation environment. In addition, the method may also include providing a license to use the copyright interest to the initiating patron, the different patron, and/or other interested parties. The method may optionally release the copyright interest to the initiating patron, the different patron, and/or the entity based on an agreement between the parties.

In another aspect, a system includes a request aggregation environment to manage pooled consideration associated with each one of a set of requests generated by users to at least one of a set of entities, an initiator device to generate an initial consideration associated with at least one of the set of requests and a supporter device to provide supporting consideration to the set of requests funded through the initiator device.

The system may further include a validation module of the request aggregation environment to determine whether a contact information of the entity (e.g., an individual, a group, a business, a celebrity and/or an organization, etc.) provided through the initiator device and the supporter device references to a verified contact data, and to validate to the contact information with the entity when the verified contact data is absent.

In addition, the system may also include a notification and communication module of the request aggregation environment to communicate the request (e.g., a performance request, a task request, a job request, an article request, a charitable request, an interview, a question to answer, an invitation, a self promotion, a donation request, a mission and/or an altruistic request, etc.) to the entity based on the contact information and/or the verified contact data.

The system may further include a central database of the request aggregation environment to store information including the set of requests, a set of user profiles, the contact data as the verified contact data, and other information. A pledge module of the request aggregation environment to allocate the initial consideration and the additional consideration through an account funded through a subscription service and/or a trusted financial intermediary.

The system may further include a notification and communication module of the request aggregation environment to generate a summary view of the request and other requests when the initial consideration and the additional consideration reach an acceptable value set by the entity, and to process a response of the entity to the request. The system may also include a verification interface of the request aggregation environment to allocate the initial consideration and the additional consideration to the entity based on an initiating patron specified criteria (e.g., may be a weighted preference based on consideration provided to the request, an equal preference based on a number of patrons providing any consideration to the request and/or a verification threshold set by the initiating patron) provided by the initiating patron prior to the response of the entity to the request. In addition, the system may also include a private/public module to enable generation of a private request shared only with invitees and the entity and a public request shared with all users of the request aggregation environment.

The system may further include a dispute resolution module of the request aggregation environment to assign a neutral third party to arbitrate disputes between patrons and the entity through the verification interface. The system may also include a response module of the request aggregation environment to automatically accept the request on behalf of the entity when the threshold value is exceeded. In addition, the system may also include a payment module of the request aggregation environment to allocate a service fee to the request aggregation environment when the response is accepted through the verification interface, and to issue a refund to the initiating patron and the different patron when the response is rejected through the verification interface.

In yet another aspect, a method includes allocating consideration provided by multiple and distinct users to a common request to increase a value of the request to a respondant and displaying the common request and other requests to the multiple and distinct users and the respondant. In addition, the method may also providing an interface to the multiple and distinct users to verify and validate a response to the common request when the respondant provides a response to the common request.

The method may further include providing an interface such that the respondant and the multiple and distinct users providing consideration to the common request are able to resolve disputes through a neutral third party assigned in the interface through a common agreement between the respondant, and the multiple and distinct users and designating where the consideration provided by the multiple and distinct users is to be allocated based on a preference of the respondant. In addition, the method may include providing a refund to the multiple and distinct users when the respondant does not accept the request and when the response is rejected through the verification interface after applying a service fee.

The method may further include assigning a copyright interest in the response to a request aggregation environment that retains ownership and license rights to any works of authorship produced through the response. The method may also include providing an interface to the multiple and distinct users to give feedback of the response to the respondant in form such that the feedback and any response thereto are viewable by other users.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 6A is a user interface view of a response requested of an entity, according to one embodiment.

FIG. 6B is a user interface view of requests associated with a patron, according to one embodiment.

FIG. 7 is a user interface view of selecting a verification method, according to one embodiment.

FIG. 9A is a patron view of aggregated consideration associated with requests in the request aggregation environment, according to one embodiment.

FIG. 9B is an entity view of aggregated consideration associated with requests in the request aggregation environment, according to one embodiment.

FIG. 10 is a user interface view displaying a selection of money pools associated with requests in the request aggregation environment, according to one embodiment.

Other features of the present embodiments will be apparent from the accompanying drawings and from the detailed description that follows.

DETAILED DESCRIPTION

A method and system of aggregating consideration associated with a request is disclosed. In the following description, for the purposes of explanation, numerous specific details are set forth in order to provide a thorough understanding of the various embodiments. It will be evident, however to one skilled in the art that the various embodiments may be practiced without these specific details.

Figure 1:
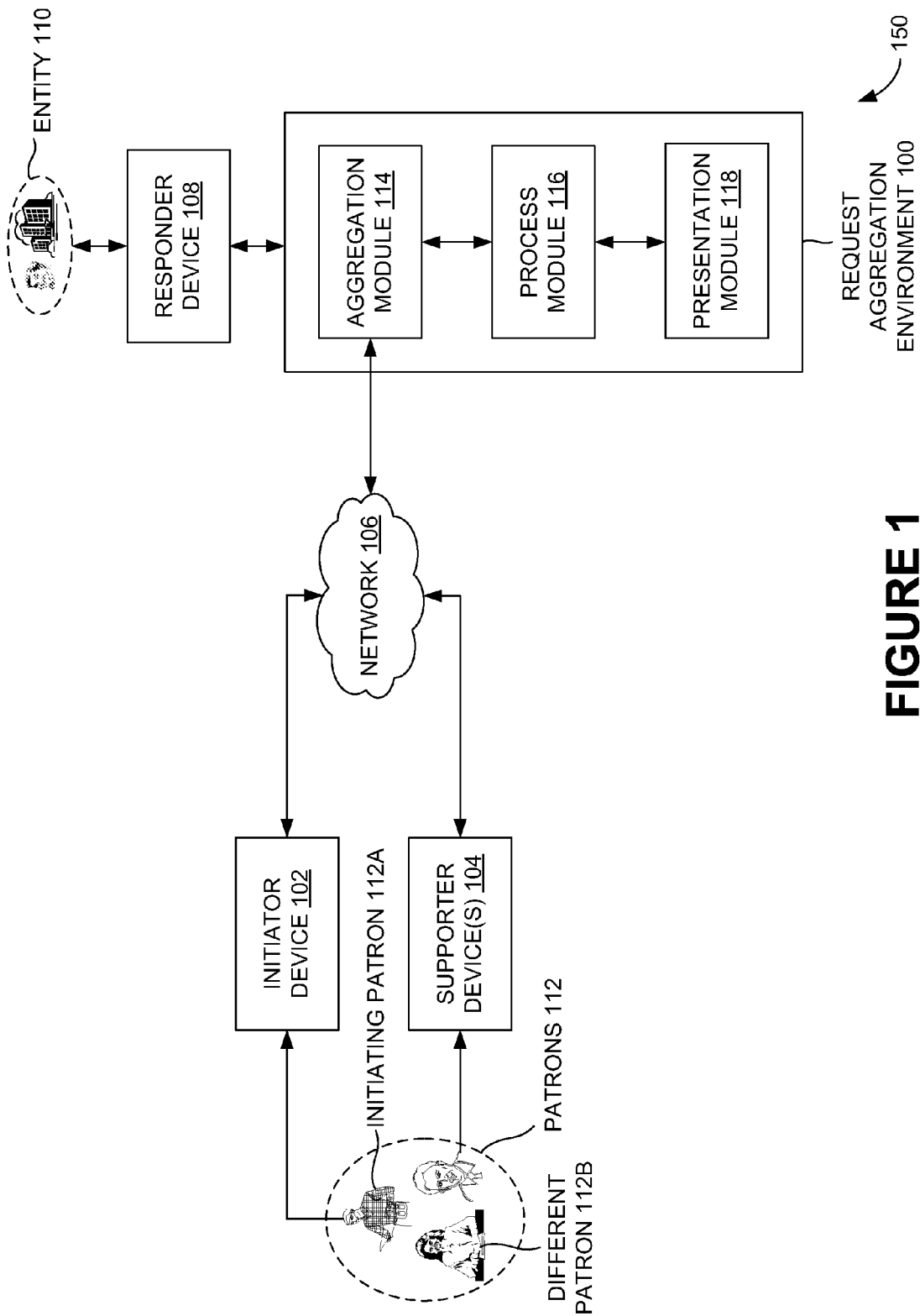
FIG. 1 is a system view of patrons communicating with an entity in a request aggregation environment, according to one embodiment.
Figure 2:
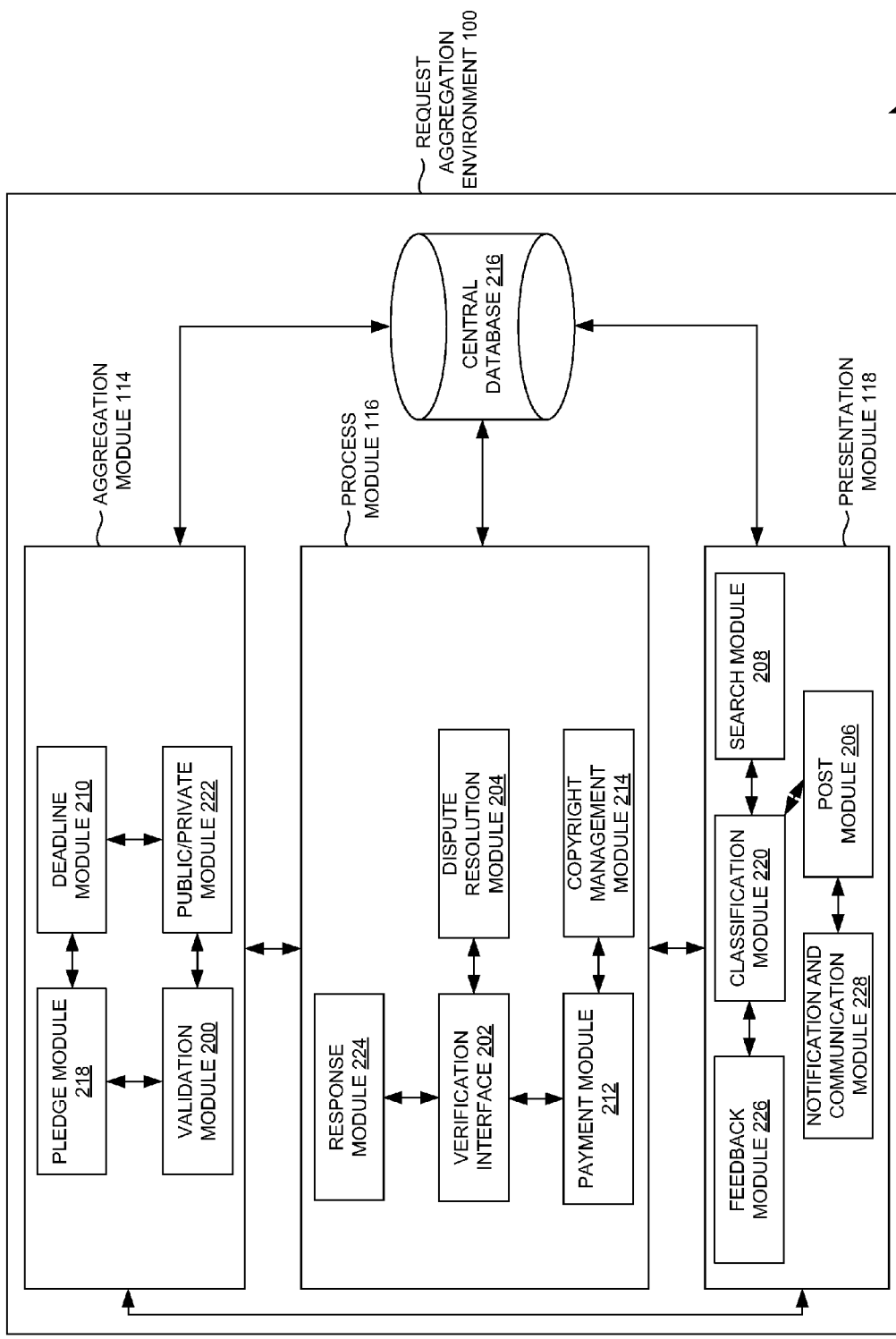
FIG. 2 is an exploded view of the request aggregation environment, according to one embodiment.

In one embodiment, a method includes generating a request of an entity (e.g., the entity 110 of FIG. 1, an individual, a group, private figure, a public figure, a celebrity, a business and/or an organization, etc.) based on a set of parameters (e.g., tasks) provided by an initiating patron (e.g., the initiating patron 112A of FIG. 1, a requestor, etc.) of the entity 110, allocating an initial consideration (e.g., a bid, a sum of money, etc.) to the request from the initiating patron 112A, generating a profile of the request having the initial consideration in a request aggregation environment (e.g., the request aggregation environment 100 of FIG. 1, a network, a community, etc.) and allocating, to the initial consideration, an additional consideration provided when a different patron (e.g., the different patron 112B of FIG. 1, a supporter, etc.) contributes the additional consideration to the request (e.g., using a pledge module 218 of FIG. 2).

In another embodiment, a system includes the request aggregation environment 100 to manage pooled consideration (e.g., the money pool) associated with each one of a set of requests generated by users (e.g., the patrons 112 of FIG. 1) to at least one of a set of entities 110, an initiator device (e.g., the initiator device 102 of FIG. 1) to generate an initial consideration associated with at least one of the set of requests and a supporter device (e.g., the supporter device(s) 104 of FIG. 1) to provide supporting consideration to at least one of the set of requests funded through the initiator device 102 (e.g., using the pledge module 218 of FIG. 2 to increase the money pool associated with a request in the request aggregation environment 100).

In yet another embodiment, a method includes allocating consideration provided by multiple and distinct users to a common request to increase a value of the request to a respondant (e.g., as illustrated in FIG. 6B), displaying the common request and other requests to the multiple and distinct users and the respondant and providing an interface (e.g., the verification interface 202 of FIG. 2) to the multiple and distinct users to verify and validate a response to the common request when the respondant provides a response to the common request (e.g., using the notification and communication module 228 of FIG. 1). For example, a money pool for a request may be established by multiple patrons and/or groups aggregating consideration associated with the request to the entity 110, as illustrated in FIG. 10.

FIG. 1 is a system view of patrons 112 communicating with an entity 110 in a request aggregation environment 100, according to one embodiment. Particularly, FIG. 1 illustrates the request aggregation environment 100, an initiator device 102, a supporter device(s) 104, a network 106, a responder device 108, the entity 110, the patrons 112, an initiating patron 112A, a different patron 112B, an aggregation module 114, a process module 116 and a presentation module 118, according to one embodiment.

The request aggregation environment 100 (e.g., a network, a social network, a community, a platform, etc.) may manage pooled consideration (e.g., aggregated sums of money) associated with a set of requests generated by users (e.g., the patrons 112) to a set of entities (e.g., the entity 110). For example, the users may be patrons 112 who have submitted their request to the entity 110 along with an initial consideration (e.g., a sum of money, a bid, etc., submitted by the initiating patron 112A) and an additional consideration (e.g., submitted by the different patron 112B) in the request aggregation environment 100.

The initiator device 102 may generate an initial consideration associated with a request (e.g., of the initiating patron 112A). The supporter device(s) 104 may provide (e.g., aggregate) supporting consideration to the request funded through the initiator device 102. The network 106 (e.g., Internet, wireless Internet, WAN, LAN, Bluetooth, Wi-Fi, Wi-Max, telecommunications, radio frequency and/or infrared network, etc.) may enable communication between the entity 110 and the patrons 112 through the request aggregation environment 100. The responder device 108 may process a response of the entity 110 (e.g., associated with requests of the patrons 112 having request parameters and/or tasks, etc.) from multiple and distinct users of the request aggregation environment 100.

The entity 110 may be an individual, a group, a business, and/or an organization that has achieved a sufficient recognition (e.g., reputation, ranking, frame among a targeted audience, etc.) and that considers responding to compelling requests submitted by the patrons 112. The patrons 112 may be followers, legal entities, observers, fans, associates, employees, and/or relatives of the entity 110 who desire to communicate a request to the entity 110. The initiating patron 112A may be the first user to define a request and/or an initial consideration to the entity 110, and/or may grant a set of permissions (e.g., as an authorized patron 112) to the different patrons 112B associated with the request to the entity 110.

The different patrons 112B may be supporters of the initiating patron 112A and/or of the request, who contribute additional consideration (e.g., through the supporter device(s) 104) to the initial consideration provided by the initiating patron 112A and who accept the set of permissions granted by the initiating patron 112A. The aggregation module 114 may process and/or manage aggregations (e.g., combinations) of requests and associated consideration generated by initiating patrons 112A and different patrons 112B to the entity 110.

The process module 116 may process a response of the entity 100 to the request and allocate the initial consideration and the additional consideration to the entity 110 based on a criteria (e.g., may be a weighted preference based on consideration provided to the request, and an equal preference based on a number of patrons 112 providing any consideration to the request and/or a verification threshold set by the initiating patron) specified by the initiating patron 112A (e.g., specified by the initiating patron prior to the response of the entity 110 to the request). The presentation module 118 may communicate the request to the entity 110 and generate a summary view of the request and other request (e.g., based on the requests when the initial consideration and the additional consideration reach an acceptable value set by the entity 110), and enable grouping and sorting of single and/or multiple requests based on a priority in categories searchable in any number of dimensions (e.g., based on profiles of entities 110, parameters of the requests, aggregated consideration associated with the requests, etc.).

In the example embodiment illustrated in FIG. 1, the entity 110 interacts with the responder device 108, the patrons 112 and the request aggregation environment 100 through the network 106. The patrons 112 include the initiating patron 112A who communicates with the network 106 through the initiator device 102, and the different patron 112B who communicates with the network 106 through the supporter device(s) 104. In addition, the request aggregation environment 100 includes the aggregation module 114, the process module 116 and the presentation module 118.

In one embodiment, the request (e.g., a performance request, a task request, a job request, an article request, a charitable request, an interview, a question to answer, an invitation, a self promotion, a donation, a mission and/or an altruistic request, etc.) of an entity 110 (e.g., an individual, a group, a business, a celebrity and/or an organization) may be generated based on a set of parameters (e.g., required tasks) defined by the initiating patron 112A of the entity 110. The initial consideration (e.g., a sum of money to motivate the entity 110 to respond to the request) may be allocated to the request from the initiating patron 112A.

A profile of the request having the initial consideration may be generated in the request aggregation environment 100 (e.g., using the presentation module 118 of FIG. 1). The additional consideration may be allocated to the initial consideration when the different patron 112B contributes the additional consideration to the request (e.g., of the initiating patron 112A). The request aggregation environment 100 may manage pooled consideration associated with each one of the sets of requests generated by users to at least one of a set of entities 110. The initiator device 102 may generate an initial consideration associated with the set of requests. The supporter device 104 may provide supporting consideration to the set of requests funded through the initiator device 102.

FIG. 2 is an exploded view 250 of the request aggregation environment 100, according to one embodiment. Particularly, FIG. 2 illustrates the request aggregation environment 100, the aggregation module 114, the process module 116, a presentation module 118, a validation module 200, a verification interface 202, a dispute resolution module 204, a post module 206, a search module 208, a deadline module 210, a payment module (include payment, refund, fee) 212, a copyright management module 214, a central database 216, a pledge module 218, a classification module 220, a public/private module 222, a response module 224, a feedback module 226, a notification and communication module 228, according to one embodiment.

The validation module 200 may determine whether contact information of the entity 110 is provided through the initiator device 102 and the supporter device(s) 104 and/or references to a verified contact data. The verification interface 202 may allocate the initial consideration and the additional consideration to the entity 110 based on an initiating patron specified criteria provided prior to the response of the entity 110 to the request. The dispute resolution module 204 may assign a neutral third party to arbitrate disputes between patrons 112 and the entity 110 through the verification interface 202. The search module 208 may enable the respondant to search for grouped requests having various categories in any number of dimensions. In addition, the search module 208 may also enable patrons 112 to designate and search any number of interests in profiles of the patrons 112. The deadline module 210 may initiate a set of deadlines to the request based on a set of permissions authorized by the initiating patron 112A. For example, the set of deadlines may include a first deadline to provide additional consideration, a second deadline to add additional requests when the initiating patron provides for this ability, a third deadline to accept the request and a fourth deadline to fulfill the request after accepting.

The payment module 212 may allocate a service fee to the request aggregation environment 100 when the response is accepted through the verification interface 202, and to issue a refund to the initiating patron 112A and the different patron 112B when the entity 110 does not accept the request and the response is rejected through the verification interface 202.

The copyright management module 214 may assign a copyright interest in the response that retain ownership and license rights to any work of authorship produced through the response. The central database 216 may store information including the set of requests, a set of user profiles, the contact data as the verified contact data, and other information. The pledge module 218 may allocate the initial consideration and the additional consideration through an account funded through a subscription service and/or a trusted financial intermediary. For example, a minimum pledge amount may be set to the request based on the set of permissions authorized by the initiating patron 112A.

The classification module 220 may group the request and the multiple requests into various categories searchable in any number of dimensions. The public/private module 222 may enable a public group that can be subscribed to by any user or a private group that can only be subscribed by the patrons 112 who are invited by the patron who started the private group. The private request submitted by the entity 110 may mask an identity of the initiating patron 112A and may be shared only with invitees and the entity 110. The response module 224 may automatically accept the request on behalf of the entity 110 when the threshold value is exceeded.

In the example embodiment illustrated in FIG. 2, the request aggregation environment 100 includes the aggregation module 114, the presentation module 118 and the process module 116 that communicates with the central database 216. The aggregation module 114 further includes the deadline module 210, the pledge module 218, the public/private module 222 and the validation module 200. The presentation module 118 includes the search module 208, the classification module 220, the feedback module 226, the notification and communication module 228 and the post module 206. The process module 116 includes the verification interface 202, the dispute resolution module 204, the payment module (include payment, refund, fee) 212, the copyright management module 214 and the response module 224 communicating with each other.

In another embodiment, it may be determined whether a contact information of the entity (e.g., the entity 110 of FIG. 1) provided by the initiating patron (e.g., the initiating patron 112A of FIG. 1) and the different patron (e.g., the different patron 112B of FIG. 1) references to a verified contact data (e.g., using the validation module 200 of FIG. 2). The request to the entity 110 may be communicated (e.g., using the notification and communication module 228 of FIG. 2) based on the contact information and the verified contact data. The response of the entity 110 to the request may be processed (e.g., using the response module 224 of FIG. 2).

The verification interface 202 may be provided to the initiating patron 112A and the different patron 112B. The initial consideration and the additional consideration may be determined (e.g., using the pledge module 218 of FIG. 2) through account funded through the subscription service and/or the trusted financial intermediary. The criteria may be set as a weighted preference based on consideration provided to the request and an equal preference based on a number of patrons 112 providing any consideration to the request. A voting record in the profile of the initiating profile 112A and the different profile 112B may be stored.

Disputes between patrons 112 and the entity 110 may be arbitrated through the dispute resolution module 204 by involving a neutral third party in the verification interface 202. The request may be automatically accepted on behalf of the entity 110 when the threshold value is exceeded. A service fee may be allocated to the request aggregation environment 100 when the response is accepted through the verification interface 202. Where the initial consideration and the additional consideration are to be allocated may be designated based on a preference of the entity 110. Patrons 112 may be enabled to designate and search interest in profiles of the patrons 112.

Interest of each patron 112 may be shared with other users of the request aggregation environment 100 through their profiles. A historical record of requests of each patron 112 with other users of the request aggregation environment 100 through their profiles may be shared. A set of requests individually displayed to the patrons 112 may be customized based on the interest provided in the profiles of the patrons 112. A group of patrons 112 (e.g., may be a private group accessible only by invitees and a public group that can be subscribed to by any user) may be formed.

The initiating patron 112A may submit a private request to the entity 110 such that the private request is shared only among invitees and the entity 110. Only patrons (e.g., such as the different patron 112B) who are invited by initiating patron 112A can view and/or optionally invite other patrons to view and allocate additional consideration to the request. The identity of the initiating patron 112A associated with the private request may be masked from the entity 110. The copyright interest in the request and a response to the request by the entity 110 may be allocated to the request aggregation environment 100 based on an assignment agreement between the initiating patron 112A, the different patron 112B and the entity 110 with the request aggregation environment 100. A license may be provided to use the copyright interest to the initiating patron 112A, the different patron 112B, and other interested parties. The copyright interest may be optionally released to the initiating patron 112A, the different patron 112B, and the entity 110 based on an agreement between the parties.

The validation module 200 of the request aggregation environment 100 may determine whether a contact information of the entity 110 provided through the initiator device 102 and the supporter device 104 references to a verified contact data. The notification and communication module 228 of the request aggregation environment 100 may communicate the request to the entity 110 based on the contact information and the verified contact data. The post module 206 of the request aggregation environment 100 may post the request to the aggregation environment 100.

The central database 216 of the request aggregation environment 100 may store information including the set of requests, a set of user profiles, the contact data as the verified contact data, and other information. The pledge module 218 of the request aggregation environment 100 may allocate the initial consideration and the additional consideration through account funded through the subscription service and/or the trusted financial intermediary. The notification and communication module 228 of the request aggregation environment 100 may generate a summary view of the request and other requests when the initial consideration and the additional consideration reach an acceptable value set by the entity 110. The response module 224 of the request aggregation environment 100 may process a response of the entity 110 to the request.

The verification interface 202 of the request aggregation environment 100 may allocate the initial consideration and the additional consideration to the entity 110 based on an initiating patron specified criteria (e.g., may be a weighted preference based on consideration provided to the request, and an equal preference based on a number of patrons 112 providing any consideration to the request and/or a verification threshold set by the initiating patron) provided prior to the response of the entity 110 to the request.

The interface may be provided such that the respondant and the multiple and distinct users providing consideration to the common request are able to resolve disputes through a neutral third party assigned in the interface through a common agreement between the respondant, and the multiple and distinct users. Where the consideration provided may be designated by the multiple and distinct users are to be allocated based on a preference of the respondant. A refund to the multiple and distinct users may be provided when the respondant does not accept the request and when the response is rejected through the verification interface 202 after applying a service fee. The copyright interest may be assigned in the response to the request aggregation environment 100 that retains ownership and license rights to any works of authorship produced through the response. The feedback module 226 of the request aggregation environment 100 may provide an interface to the multiple and distinct users to give feedback of the response to the respondant in form such that the feedback and any response thereto is viewable by other users.

Figure 3:
FIG. 3 is a table view of details associated with a user request in the request aggregation environment, according to one embodiment.

FIG. 3 is a table view of details associated with a user request in the request aggregation environment 100, according to one embodiment. Particularly, FIG. 3 illustrates a request ID field 302, a request title field 304, a task field 306, a total consideration field 308, an initiator field 310, an entity field 312, a request close deadline field 314, number of patrons field 316, a type (public/private) field 318 and a category field 320, according to one embodiment.

The request ID field 302 may display a unique identity (e.g., number, key, etc.) referencing the request in the request aggregation environment 100. The request title field 304 may display the title of request to be allocated by the initiating patron 112A—and the different patron 112B to the entity 110 in the request aggregation environment 100. The task field 306 may display the kind of request (e.g., meeting request, question request, etc.) desired by the initiating patron 112A and the different patron 112B in the request aggregation environment 100.

The total consideration field 308 may display the sum of amount which is something of value provided by the patron 112 to the entity 110 such as money, goods and services that will make the request a compelling candidate for response. The initiator field 310 may display the name of the initiating patron 112A associated with the request in the request aggregation environment 100. The entity field 312 may display the name of the respondant referencing the entity 110 associated with the request in the request aggregation environment 100. The request close deadline field 314 may indicate the ending time to provide, accept and fulfill the request of the patron 112 by the entity 110. The number of patrons field 312 may indicate the total number of participant patrons 112 taking part in the request in the request aggregation environment 100. The type (public/private) field 318 may display the type of request (e.g., public request, private request, etc.) submitted by the patrons 112 to the entity 110. The category field 320 may display the classification under which the request is associated in the request aggregation environment 100.

In the example embodiment illustrated in FIG. 3, the request id field 302 displays "1001" in the first row, indicating the unique identity (e.g., number, key, etc.) in the request id field column 302. The request title field 304 displays "Question Bob Smith" in the first row, indicating the title of the request to be allocated by the initiating patron 112A and the different patron 112B to the respondant in the request aggregation environment 100. The task field 306 displays "Question" in the first row, indicating that the different patron 112B requests an answer to a question, in the task field column 306. The total consideration field 308 displays "$70000" in the first row, indicating the total amount of consideration provided by the patrons 112 to the entity 110 along with each request in the total consideration provided field column 308.

The initiator field 310 displays "Michael Lee" in the first row, indicating the name of the initiating patron 112. The entity field 312 displays "Bob Smith" in the first row, indicating the name of the respondant. The request close deadline field 314 displays "Jul. 1, 2008" in the first row, which indicates the ending times to provide, accept and fulfill the requests of the patron 112 by the entity 110, in the request close deadline field column 314. The number of patrons field 316 displays "1000" in the first row, which indicates the total number of participant patrons 112 taking part in the request in the request aggregation environment 100. The type (public/private) field 318 displays "Public" in the first row, which indicates the type of request submitted by the patron 112 to the entity 110, in the type (public/private) field column 318. The category field 320 displays "sports" in the first row, which indicates the classification under which the request is associated in the request aggregation environment 100.

Figure 4:
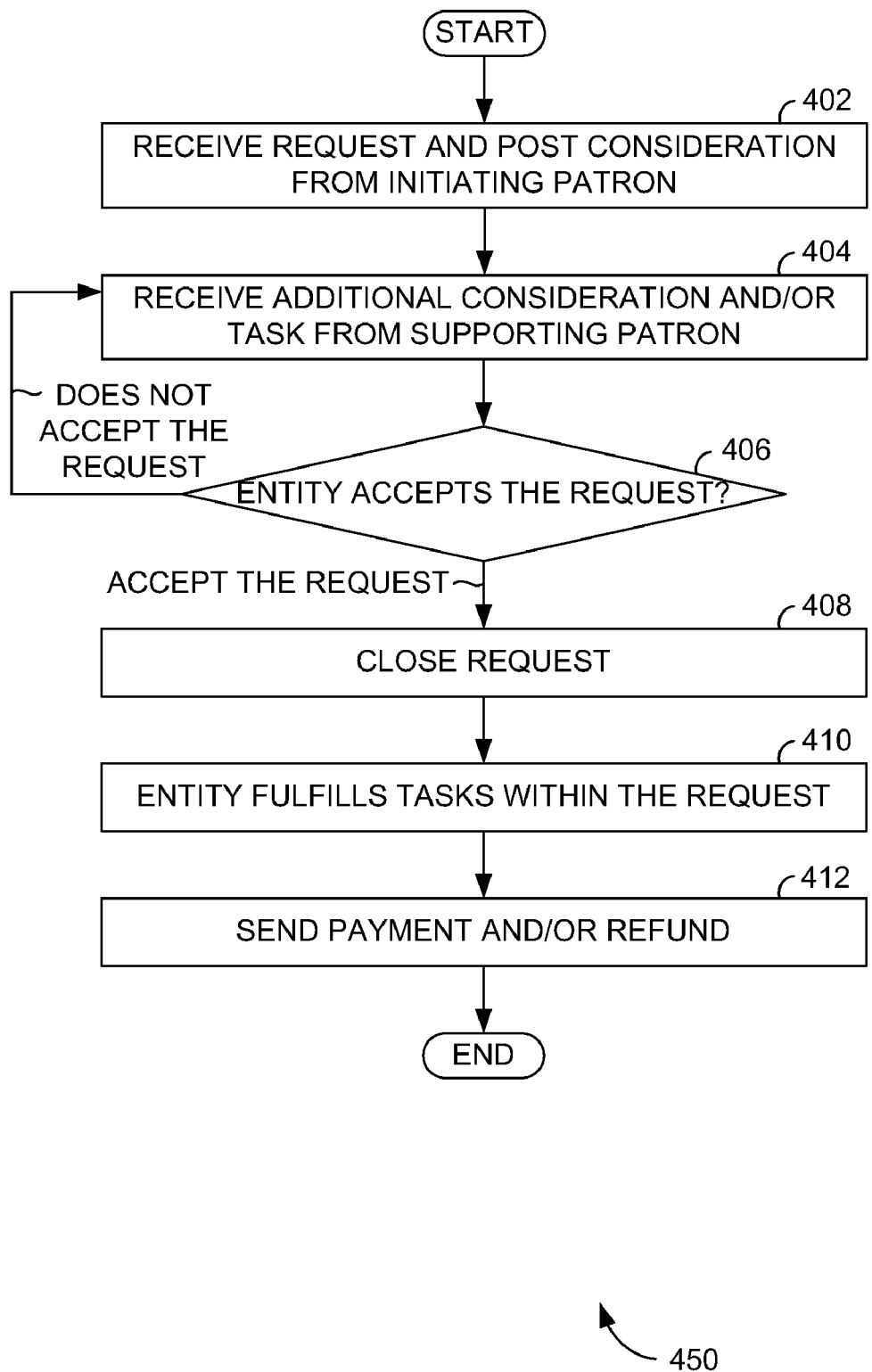
FIG. 4 is a flow chart of processing the request through the request aggregation environment, according to one embodiment.

FIG. 4 is a flow chart of processing the request through the request aggregation environment 100 of FIG. 1, according to one embodiment. In operation 402, a request from patrons 112 (e.g., may be the performance request, the task request, the job request, the article request, the charitable request, the interview, the question to answer, the invitation, the self promotion, the donation request, the mission, and/or the altruistic request.) is received and initial consideration from initiating patron 112A to the entity 110 is posted. For example, the entity may be an individual, a group, a business, a celebrity and/or an organization.

In operation 404, additional consideration and/or task from the patrons 112 is received by the entity 110 (e.g., based on a verified contact data (e.g., using a notification and communication module 228 of FIG. 1)). In operation 406, it is determined whether the entity 110 accepts the request. If the entity 110 accepts the request, operation 408 is performed. If the entity 110 does not accept the request then the operation 404 continues. In operation 408, after the entity 110 accepts the request, the request is closed. In operation 410, the entity 110 fulfills tasks within the requests made by the patrons 112 based on a set of deadlines. In operation 412, if the entity 110 has fulfilled as per the request of the patrons 112 after accepting then a payment is provided to the entity 110 after a service fee is allocated to the request aggregation environment 100 or else if the request is rejected a refund is provided to the patrons 112 after applying the service fee.

Figure 5A:
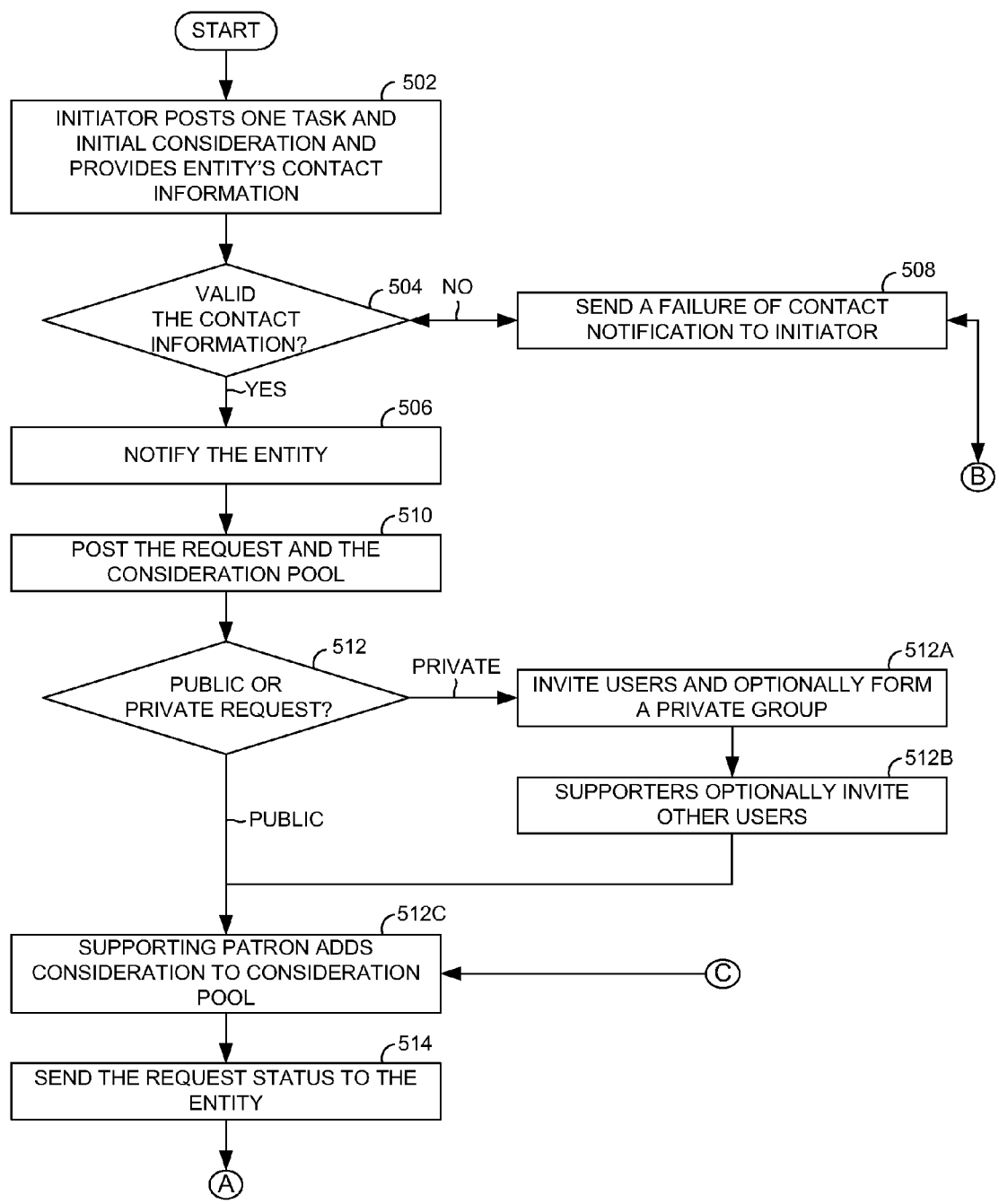
FIG. 5A is a flow chart of aggregating consideration associated with a request processed through the request aggregation environment, according to one embodiment.

FIG. 5A is a flow chart of aggregating consideration associated with a request processed through the request aggregation environment 100, according to one embodiment. In operation 502, an initiating patron 112A may post one task along with initial consideration (e.g., using the initiator device 102 of FIG. 1) and may provide entity 110 contact information. In operation 504, it may be determined whether the contact information provided by the initiating patron 112A is valid or not (e.g., using a validation module 200 of FIG. 2). If the contact information provided by the initiating patron 112A is valid then operation 506 may be initiated. If the contact information provided by the initiating patron 112A is not valid, then operation 508 may be initiated.

In operation 506, after the contact information of the entity 110 provided by the initiating patron 112A turns out to be valid, then entity 110 may be notified. In operation 508, a failure contact notification may be sent to initiating patron 112A, when the contact information of the entity 110 provided by the initiating patron 112A turns out to be invalid then the operation refund process 534 is performed. In operation 510, the consideration may be posted to the entity 110 after the successful notification to the entity 110.

In operation 512, it may be determined whether the request is public or private (e.g., using a public/private module 222 of FIG. 2). If the request is public then operation 512C may be initiated. If the request is private then operation 512A may be initiated. In operation 512A, the initiating patron 112A may invite the different patrons 112B to join the request and have an option to form a private group. In operation 512B, the supporters may optionally invite other users to add consideration to the request. In operation 512C, supporter patrons (e.g., the different patrons 112B of FIG. 1) may add additional consideration (e.g., may be something of value provided by the patron 112 to the entity 110, such as money, goods and services that will make the request a compelling candidate) to the request initiated by the initiating patron 112A. In operation 514, the request status of the patrons 112 may be sent to the entity 110.

Figure 5B:
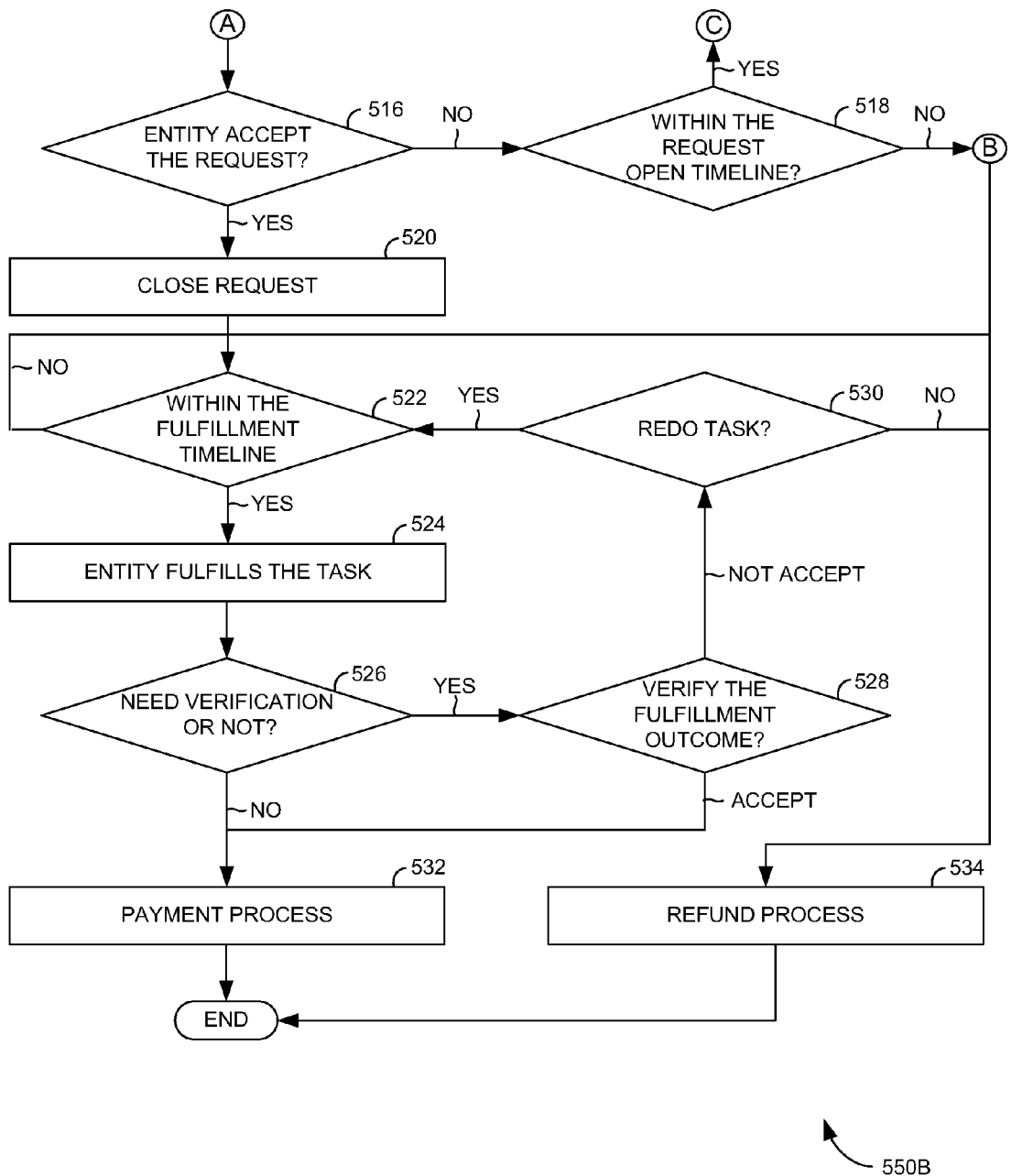
FIG. 5B is a continuation of the flow chart of FIG. 5A illustrating additional processes, according to one embodiment.

FIG. 5B is a continuation of the flow chart of FIG. 5A illustrating additional processes, according to one embodiment. In operation 516, it may be determined whether entity 110 accepts the request or not. If the entity 110 accepts the request, operation 520 may be initiated. Otherwise, if the entity 110 does not accept the offer, then operation 518 may be initiated. In operation 518, a condition may be determined to accept the request within the open timeline. If the timeline for the entity 110 to accept the offer is still open, then operation 512C may be initiated for additional consideration from supporter patrons 112B. If the timeline to accept the offer is closed, then operation 534 may be performed. In operation 520, the request can be closed after the entity 110 accepts the offer.

In operation 522, it may be determined whether the entity 110 can fulfill the request of the patrons 112 within the fulfillment timeline. If the entity 110 is unable to fulfill the task as per the request of the patrons 112 within the timeline then operation 534 may be performed. If the entity 110 can fulfill the request within the defined timeline operation 524 can be initiated. In operation 524, the entity 110 can fulfill the task after accepting the request. In operation 526, a condition may be determined to verify the outcome of fulfillment. If a verification is requested by the patrons 112, then operation 528 may be performed. If the verification is not requested by the patrons 112, then operation 532 may be performed.

In operation 528, if the patrons 112 do not accept the fulfillment outcome then it may be determined whether the task is to be redone within the timeline. If the patrons 112 verify the fulfillment outcome, then operation 532 may be performed. In operation 530, if the task can be redone within the timeline, then operation 522 and further operations from 522 may be performed. If the task cannot be redone within the timeline then operation 534 may be performed. In operation 532, after the patron 112 accepts the fulfillment outcome of the task, then payment may be processed to the entity 110. In operation 534, the refunding process may be processed to the patrons 112.

In one embodiment, the contact information may be validated with the entity (e.g., the entity 110 of FIG. 1) when the verified contact data is absent. The contact data may be stored as the verified contact data. The initial consideration and the additional consideration may be allocated to the entity 110 based on an initiating patron specified criteria (e.g., the initiating patron 112A of FIG. 1) provided prior to the response of the entity 110 to the request (e.g., using verification interface 202 of FIG. 2). The initiating patron 112A and the different patron (e.g., the different patron 112B of FIG. 1) may be enabled to create and submit multiple requests to the entity 110. The request and the multiple requests may be grouped in categories searchable in any number of dimensions.

The initiating patron 112A and the different patron 112B may be enabled to allocate tasks to the request based on the set of permissions authorized by the initiating patron 112A. A minimum pledge amount and a set of deadlines (e.g., may include a first deadline to provide the additional consideration, a second deadline to add additional requests when the initiating patron 112A provides for this ability, a third deadline to accept the request and a fourth deadline to fulfill the request after accepting) may be set to the request based on the set of permissions. Additional information associated with the request and a response to the request by the entity 110 may be accepted in any multimedia format.

In another embodiment, the refund may be provided to the initiating patron (e.g., the initiating patron 112A of FIG. 1) and the different patron (e.g., the different patron 112B of FIG. 1) when the response is rejected through the verification interface (e.g., the verification interface 202 of FIG. 2) after applying the service fee. A partial fulfillment and redoing of the request by the entity (e.g., the entity 110 of FIG. 1) may be permitted when the initiating patron 112A and the different patron 112B permits. Providing to the entity 110 a feedback to the response may be enabled by the initiating patron 112A and the different patron 112B.

FIG. 6A is a user interface view 650A of a response requested of an entity 110, according to one embodiment. Particularly, FIG. 6A illustrates a request ID 600, an initiator 602, a consideration size 604, total request members 606, a minimal contribute unit 608, accepting deadline 610, allow additional tasks 612, allow fulfill less tasks 614, an task deadline 616, a fulfill deadline 618, a verification method 620, a redo allow 622, task 1 624 and task 2 626, and upload images or video clips option 628, according to one embodiment.

The request ID 600 may be an identifier (e.g., unique number, code, etc.) referencing offers associated with the request submitted by the initiating patron 112A to the entity 110. The initiator 602 may be a name of the initiating patron 112A who submits the request to the entity 110. The consideration size 604 may be something of value provided by the patron 112 to the entity 110 such as money, goods and services that will make the request a compelling candidate for response. The total request members 606 may indicate the total number of the patrons 112 participating in the request. The minimal contribute unit 608 may be a minimum consideration amount for the offer preferred by the initiating patron 112A.

The accepting deadline 610 may be a third deadline to accept the request by the entity 110. Allow additional tasks 612 may be an option to opt for additional tasks to be added by the different patron 112B to the request allowed by the initiating patron 112A. Allow fulfill less tasks 614 may be an option to allow the entity 110 to fulfill only a portion of the tasks in the request. The add task deadline 616 may be a second deadline to allocate additional task for the submission of the offer by the patrons 112 to the entity 110. The fulfill deadline 618 may be a fourth deadline to fulfill the request after accepting the request made by the patrons 112.

The verification method 620 may be a method of verification, by which the patrons 112 verify the responses of the entity 110 (e.g., by method of voting by the patrons 112, by initiating patron 112A, by a neutral third party etc.). The redo allow 622 may be number of times the entity 110 can fulfill the request for the patrons 112 to accept it. The 'task 1' 624 and 'task 2' 626 may be the tasks allocated by the initiating patron 112A and the different patron 112B to the respondant in any multimedia format (e.g., the respondant may enter the responses in the text fields). Upload images or video clips option 628 may be an option through which respondant referencing the entity 110 may respond to the request made by the patron 112 by uploading in the multimedia content.

In the example embodiment illustrated in FIG. 6A, the user interface view 650A displays the respondant view having a request format submitted by the initiating patron 112A to the respondant referencing the entity 110 which includes the offer Id 600 displaying a unique Id (e.g., A1011145) with respect to the request made by the initiator 602 (e.g., Chris Bob) who is the initiating patron 112A for this request. The user interface view 650A also displays consideration size 604 which is the amount for which the request has been made along with the total request members 606, the minimal contribute unit 608, the accepting deadline 610, allow additional tasks 612, allow fulfill less tasks 614, the add task time line 616, the fulfill deadline 618, the verification method 620 and redo allow 622. The task 1 624 and task 2 626 may be the tasks allocated based on the request submitted by the patrons 112 to the respondant referencing the entity 110. The upload images or video clips 628 displays an option though which the respondant referencing the entity 110 can respond to the request made by the patrons 112 through the multimedia format.

The summary view of the request and other requests having an initial consideration and an additional consideration reach an acceptable value set by the entity (e.g., the entity 110 of FIG. 1) in a profile of the entity 110 may be generated. The consideration provided by multiple and distinct users to a common request may be allocated to increase a value of the request to a respondant. The common request and other requests may be displayed to the multiple and distinct users and the respondant.

FIG. 6B is a user interface view 650B of requests associated with the patron 112, according to one embodiment. Particularly, FIG. 6B illustrates a request block 630, a type of request 632, a verification option 634, a my consideration 636, tasks 638 and an add more tasks option 640, according to one embodiment. The request block 630 may display title, information and details of the request along with the access privileges and the amount of consideration the patrons 112 are willing to provide to the entity 110. The type of request 632 may display the access privileges enabling the initiating patron 112A to submit a private request or public request. For example the private request may be shared only among invitees and the entity 110 (e.g., only the different patron 112B who are invited by initiating patron 112A can view and optionally invite other different patron 112B to view and allocate additional consideration to the request). In contrast, the public request may be accessible by any patron.

The verification option 634 may allow the user to verify the request the verification interface 202 as previously described. The patrons 112 may also accept the response of the entity 110 without verification. The tasks 638 may enable the initiating patron 112A and the different patron 112B to allocate number of tasks to the request based on the set of permissions authorized by the initiating patron 112A. The add more task option 640 may display an option to add additional task by the initiating patron 112A and the different patron 112B based on the set of permissions authorized by the initiating patron 112A.

In the example embodiment illustrated in FIG. 6B, the user interface view 650B displays the patron view having a submission format for the patrons 112 to fill the request along with the consideration and submit the offer to the entity 110. In addition, the user interface view 650B displays the request block 630 which displays the information and details of the request along with the access privileges and the amount of consideration to be accepted by the entity 110 from the patrons 112. The tasks 638 and add more task option 640 enables the initiating patron 112A and the different patron 112B to allocate additional task to the request before the expiry timeline of the offer. The interface to the multiple and distinct users may be provided to verify and validate a response to the common request when the respondant provides a response to the common request.

FIG. 7 is a user interface view 750 of selecting a verification method, according to one embodiment. Particularly, FIG. 7 illustrates a verify by initiator only option 702, a verify by third party option 704 and a verify by vote option 706, according to one embodiment.

The verify by initiator only option 702 may be used for verification through initiating patron 112A only. The verify by third party option 704 may be the verification by neutral third party assigned in the verification interface 202 using third party's name, email and address. The verify by vote option 706 may be used for verification of votes per money pool member or verification of vote per dollar of money pool money.

In the example embodiment illustrated in FIG. 7, the user interface view 750 displays various methods for verification. The verification may be processed by an initiator, a third party, and/or through a voting process. The third party verification has various structured fields to display third party name, email and/or address to be filled by the initiator. The vote verification is processed by either verification of votes per money pool member option, verification of vote per dollar of money pool money option, and/or a vote threshold set by the initiator.

Figure 8:
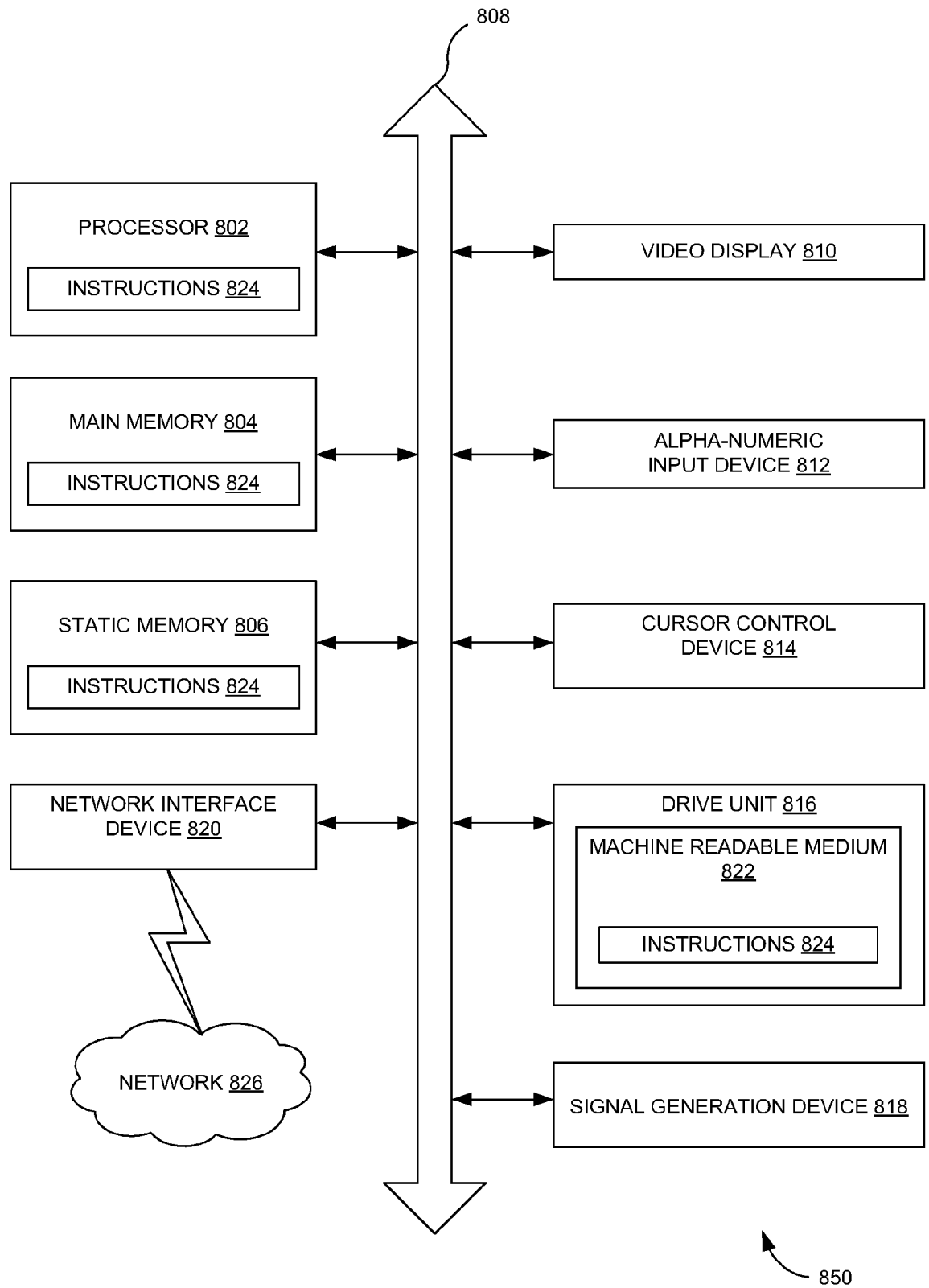
FIG. 8 is a diagrammatic system view of a data processing system in which any of the embodiments disclosed herein may be performed, according to one embodiment.

FIG. 8 is a diagrammatic system view 850 of a data processing system in which any of the embodiments disclosed herein may be performed, according to one embodiment. Particularly, the diagrammatic system view 850 of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The diagrammatic system view 800 may indicate a personal computer and/or a data processing system in which one or more operations disclosed herein may be performed. The processor 802 may be a microprocessor, a state machine, an application-specific integrated circuit, a field programmable gate array, etc. (e.g., Intel® Pentium® processor). The main memory 804 may be a dynamic random access memory and/or a primary memory of a computer system. The static memory 806 may be a hard drive, a flash drive, and/or other memory information associated with the data processing system.

The bus 808 may be an interconnection between various circuits and/or structures of the data processing system. The video display 810 may provide graphical representation of information on the data processing system. The alpha-numeric input device 812 may be a keypad, a keyboard and/or any other input device of text (e.g., a special device to aid the physically challenged). The cursor control device 814 may be a pointing device such as a mouse.

The drive unit 816 may be the hard drive, a storage system, and/or other longer term storage subsystem. The signal generation device 818 may be a bios and/or a functional operating system of the data processing system. The network interface device 820 may be a device that may perform interface functions such as code conversion, protocol conversion and/or buffering required for communication to and from a network 826.

The machine readable medium 822 may provide instructions on which any of the methods disclosed herein may be performed. The instructions 824 may provide source code and/or data code to the processor 802 to enable any one or more operations disclosed herein.

FIG. 9A is a form and table view 950A associated with a patron 906A, according to one embodiment. FIG. 9A illustrates an Open Offer form 902A that shows open offers submitted or participated by the patron 906A. FIG. 9A also illustrates an Offer History table 904A that shows previous offers submitted or participated by the patron 906A. The Open Offer form 902A displays the current status of the open offers. The patron 906A can add money, tasks to an offer, or verify the response of an offer. The Offer History table 904A displays some of the information inputted by the patron 906A through the Open Offers form 902A. In addition, the Offer History table 904A may show a status of each request, and may include an indicator that associates the Offer History table 904A with a Results table (not shown) that contains responses to the requests in the Offer History table 904A by the entity 906B associated with each request.

FIG. 9B is a form and table view 950B associated with an entity 906B, according to one embodiment. FIG. 9B illustrates an Open Offer form 902B that shows open offers submitted by the patron 906A to the entity 906B. FIG. 9B also illustrates an Offer History table 904B that shows previous offers submitted by the patron 906A to the entity 906B. The Open Offer form 902B displays the current status of the open offers. The entity 906B can set accept threshold of an offer, accept an offer, fulfill tasks, or select the payment method of an offer. The Offer History table 904B displays some of the information inputted by the patron 906A and also displays the request accepted, rejected or fulfilled by the entity 906B through the Open Offers form 902B. In addition, the Offer History table 904B may show a status of each request, and may include an indicator that associates the Offer History table 904B with a Results table (not shown) that contains responses to the requests in the Offer History table 904B by the entity 906B associated with each request.

FIG. 10 is a user interface view 1050 displaying a selection of money pools associated with requests in the request aggregation environment 100, according to one embodiment. In the example embodiment illustrated in FIG. 10, the user interface view 1050 displays the summary view of the requests having a top consideration to the browser (e.g., distinct users, multiple users, etc.) who can access the information provided on the webpage. In addition, the user interface view 1050 enables the user to view requests which may be classified in various categories (e.g., sports, political, question, interview, etc.) searchable in any number of dimensions by the user. For example, the patrons 112 may request the entity 110 to perform an activity for them, prepare an article for them, answer questions for them and/or video record a message for them, etc. which may be displayed in the summary view available for the users to view the request. The users can view the newest requests, the requests with most number of the patrons 112, or the requests will be ending soon, etc. in each category. The users can view the requests by search the entity 110, the patrons 112, the categories, and/or the keywords, etc.

Figure 11A:
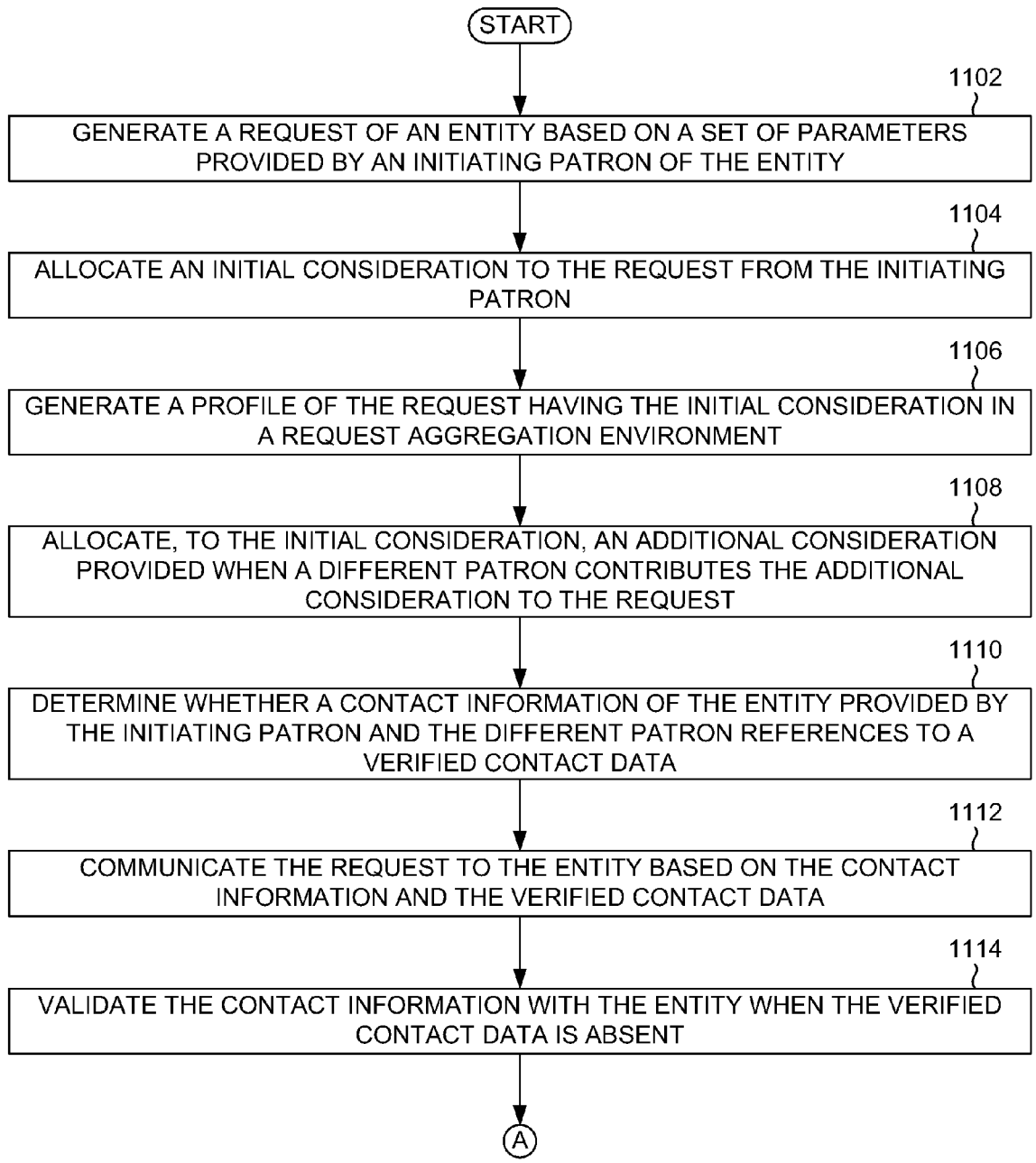
FIG. 11A is a process flow of generating a request of an entity based on a set of parameters provided by an initiating patron, according to one embodiment.

FIG. 11A is a process flow of generating a request of an entity 110 based on a set of parameters provided by an initiating patron 112A, according to one embodiment. In operation 1102, a request of an entity 110 (e.g., may be an individual, a group, a business, a celebrity, and/or an organization) may be generated based on a set of parameters provided by the initiating patron (e.g., the initiating patron 112A of FIG. 1) of the entity 110. In operation 1104, an initial consideration may be allocated to the request from the initiating patron 112A.

In operation 1106, a profile of the request having the initial consideration may be generated in a request aggregation environment (e.g., the request aggregation environment 100 of FIG. 1). In operation 1108, an additional consideration provided when a different patron (e.g., the different patron 112B of FIG. 1) contributes the additional consideration to the request (e.g., as illustrated in FIG. 9) may be allocated to the initial consideration. In operation 1110, it may be determined whether a contact information of the entity 110 provided by the initiating patron 112A and the different patron 112B references to a verified contact data (e.g., using a validation module 200 of FIG. 2). In operation 1112, the request may be communicated (e.g., using the notification and communication module 228 of FIG. 2) to the entity 110 based on the contact information and/or the verified contact data. In operation 1114, the contact information with the entity 110 may be validated when the verified contact data is absent.

Figure 11B:
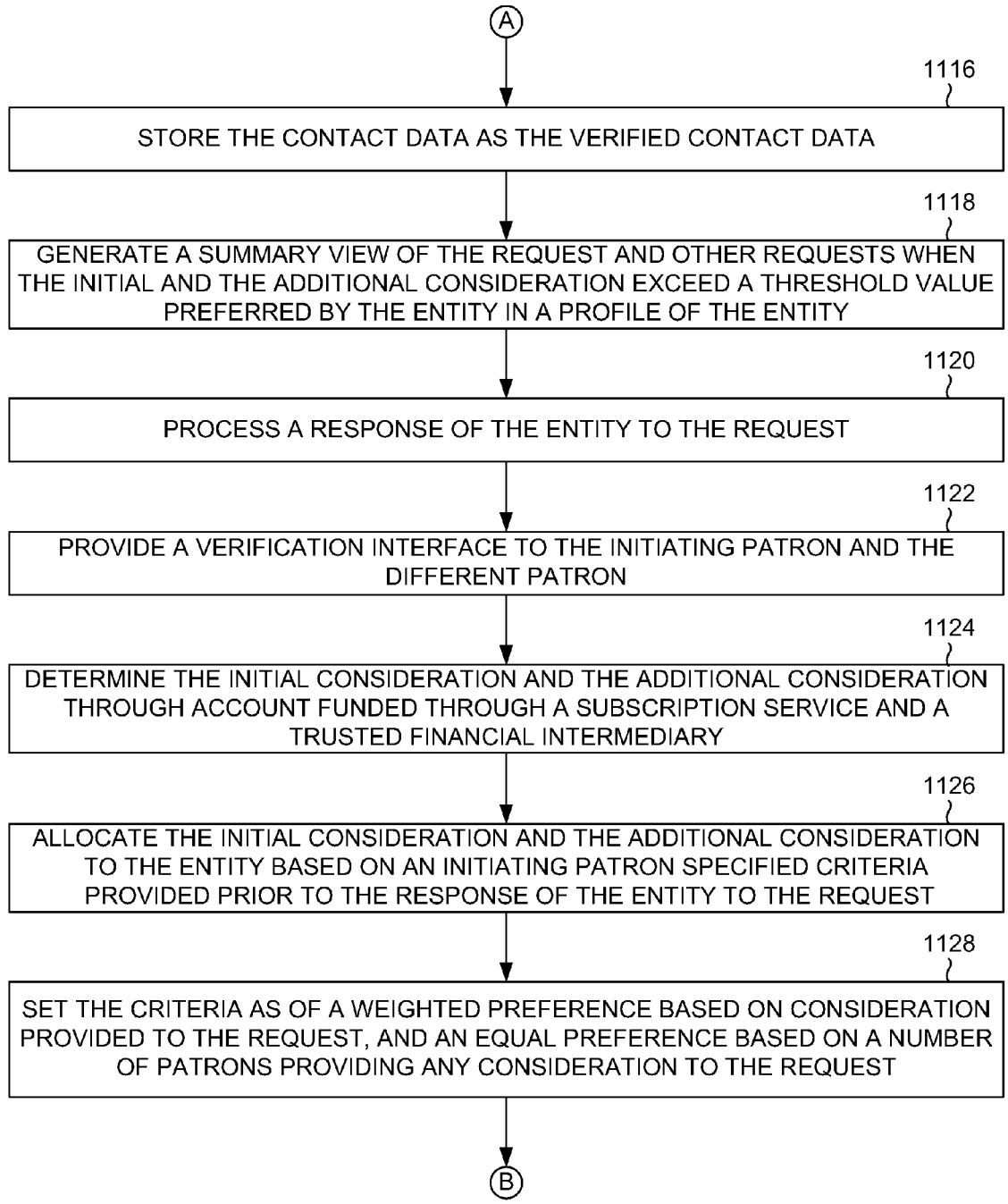
FIG. 11B is a continuation of the process flow of FIG. 11A illustrating additional processes, according to one embodiment.

FIG. 11B is a continuation of the process flow of FIG. 11A illustrating additional processes, according to one embodiment. In operation 1116, the contact data may be stored as the verified contact data. In operation 1118, a summary view of the request and other requests when the initial consideration and the additional consideration exceed a threshold value preferred by the entity 110 may be generated in a profile of the entity 110. In operation 1120, a response of the entity 110 to the request may be processed. In operation 1122, a verification interface (e.g., the verification interface 202 of FIG. 2) may be provided to the initiating patron 112A and the different patron 112B. In operation 1124, the initial consideration and the additional consideration may be determined through an account funded through a subscription service and/or a trusted financial intermediary (e.g., using the pledge module 218 of FIG. 2).

In operation 1126, the initial consideration and the additional consideration may be allocated to the entity 110 based on an initiating patron criteria specified by the initiating patron 112A prior to the response of the entity 110 to the request (e.g., using the verification interface 202 of FIG. 2). In operation 1128, the criteria may be set as a weighted preference based on consideration provided to the request and/or an equal preference based on a number of patrons 112 providing any consideration to the request.

Figure 11C:
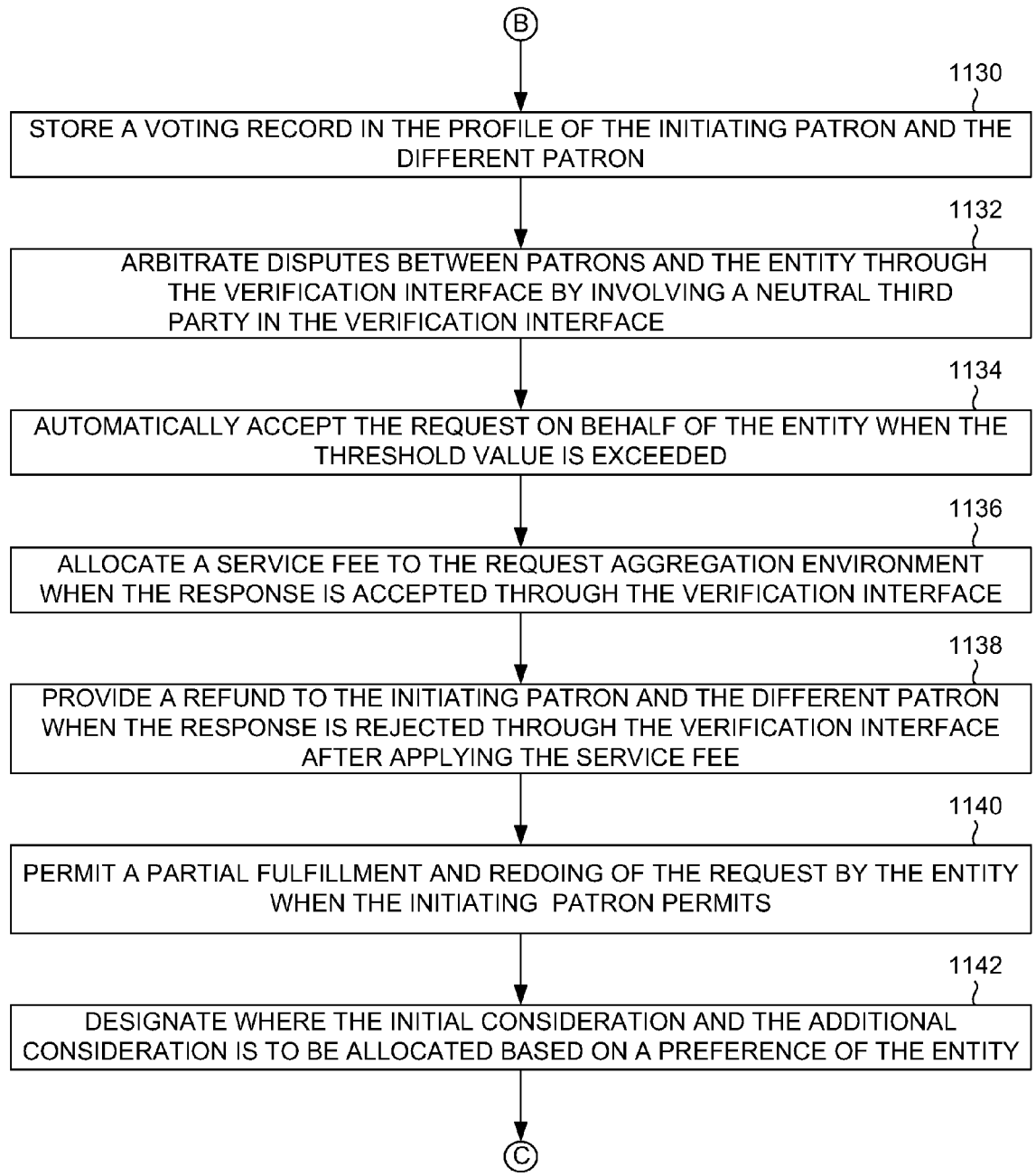
FIG. 11C is a continuation of the process flow of FIG. 11B illustrating additional processes, according to one embodiment.

FIG. 11C is a continuation of the process flow of FIG. 11B illustrating additional processes, according to one embodiment. In operation 1130, a voting record may be stored in the profile of the initiating patron 112A and the different patron 112B. In operation 1132, disputes between patrons 112 and the entity 110 may be arbitrated through the verification interface 202 by involving a neutral third party in the verification interface 202. In operation 1134, the request may be automatically accepted on behalf of the entity 110 when the threshold value is exceeded. In operation 1136, a service fee may be allocated to the request aggregation environment 100 when the response is accepted through the verification interface 202.

In operation 1138, a refund may be provided to the initiating patron 112A and the different patron 112B when the response is rejected through the verification interface 202 after applying the service fee. In operation 1140, a partial fulfillment and redoing of the request by the entity 110 may be permitted when the initiating patron 112A permits. In operation 1142, it may be designated where the initial consideration and the additional consideration is to be allocated based on a preference of the entity 110.

Figure 11D:
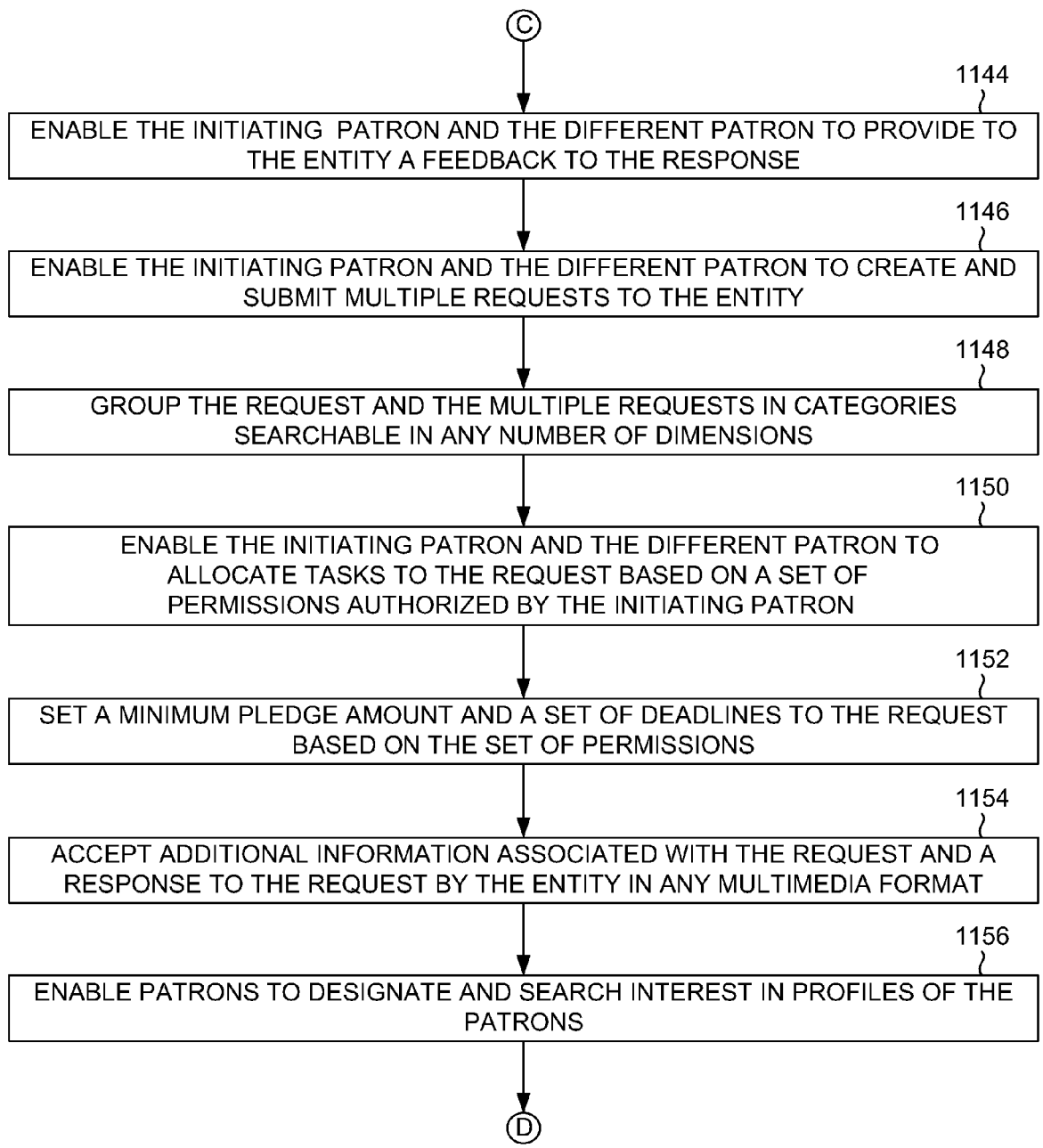
FIG. 11D is a continuation of the process flow of FIG. 11C illustrating additional processes, according to one embodiment.

FIG. 11D is a continuation of the process flow of FIG. 11C illustrating additional processes, according to one embodiment. In operation 1144, the initiating patron 112A and the different patron 112B may be enabled to provide to the entity 110 a feedback to the response. In operation 1146, the initiating patron 112A and the different patron 112B may be enabled to create and submit multiple requests to the entity 110. In operation 1148, the request and the multiple requests may be grouped in categories searchable in any number of dimensions. In operation 1150, the initiating patron 112A and the different patron 112B may be enabled to allocate tasks to the request based on a set of permissions authorized by the initiating patron 112A.

In operation 1152, a minimum pledge amount and a set of deadlines (e.g., may include a first deadline to provide the additional consideration, a second deadline to add additional requests when the initiating patron 112A provides for this ability, a third deadline to accept the request and a fourth deadline to fulfill the request after accepting) may be set to the request based on the set of permissions. In operation 1154, additional information associated with the request and a response to the request by the entity 110 may be accepted in any multimedia format (e.g., as illustrated in FIG. 6A). In operation 1156, patrons 112 may be enabled to designate and search interests in profiles of the patrons 112.

Figure 11E:
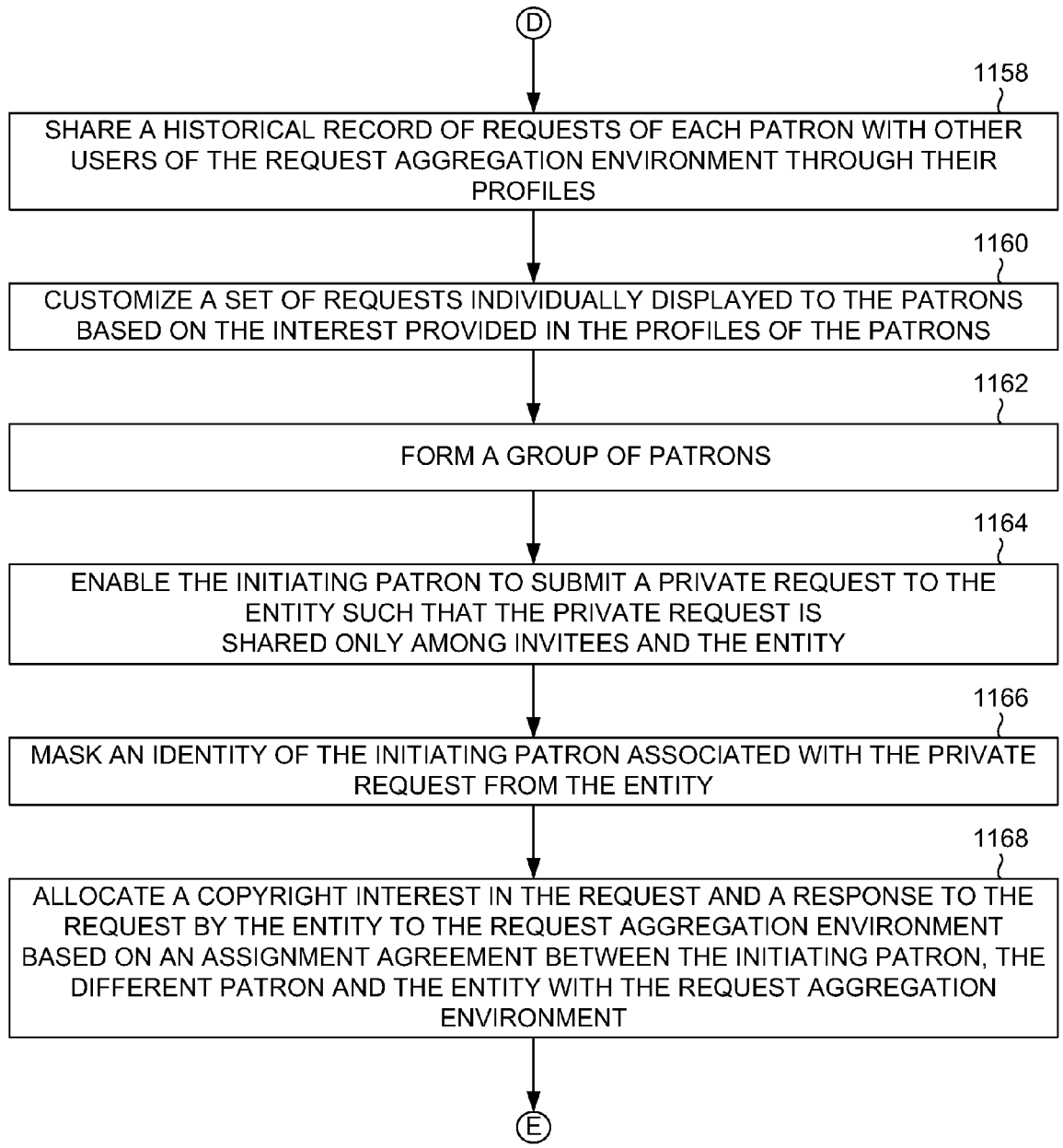
FIG. 11E and FIG. 11F is a continuation of the process flow of FIG. 11D illustrating additional processes, according to one embodiment.

FIG. 11E is a continuation of the process flow of FIG. 11D illustrating additional processes, according to one embodiment. In operation 1158, a historical record of requests of each patron 112 may be shared with other users of the request aggregation environment 100 through their profiles. In operation 1160, a set of requests individually displayed to the patrons 112 may be customized based on an interest provided in the profiles of the patrons 112. In operation 1162, a group of patrons 112 (e.g., may be a private group accessible only by invitees and/or a public group that can be subscribed to by any user) may be formed.

In operation 1164, the initiating patron 112A may be enabled to submit a private request to the entity 110 such that the private request is shared only among invitees and the entity 110. In operation 1166, an identity of the initiating patron 112A associated with the private request may be masked from the entity 110. In operation 1168, a copyright interest in the request and a response to the request by the entity 110 to the request aggregation environment 100 may be allocated (e.g., using the copyright management module 214 of FIG. 2) based on an assignment agreement between the initiating patron 112A, the different patron 112B and/or the entity 110 with the request aggregation environment 100.

Figure 11F:
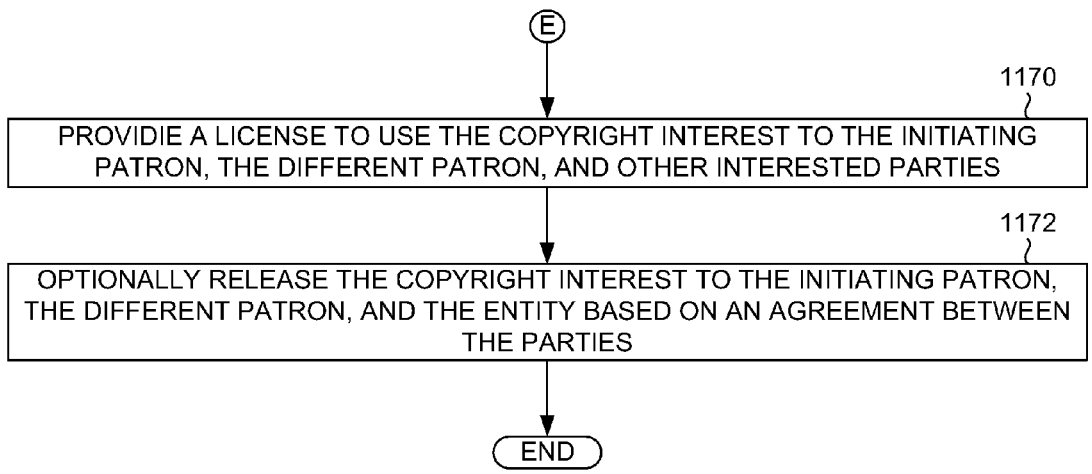

FIG. 11F is a continuation of the process flow of FIG. 11E illustrating additional processes, according to one embodiment. In operation 1170, a license to use the copyright interest may be provided to the initiating patron 112A, the different patron 112B, and other interested parties. In operation 1172, the copyright interest may be optionally released to the initiating patron 112A, the different patron 112B, and the entity 110 based on an agreement between the parties.

FIG. 12 is a process flow of allocating consideration provided by multiple and distinct users to a common request to increase a value of the request to a respondant, according to one embodiment. In operation 1202, a consideration provided by multiple and distinct users may be allocated to a common request to increase a value of the request to a respondant. In operation 1204, the common request and other requests may be displayed to the multiple and distinct users and the respondant. In operation 1206, an interface (e.g., the verification interface 202 of FIG. 2) may be provided to the multiple and distinct users to verify and validate a response to the common request when the respondant provides a response to the common request. In operation 1208, an interface may be provided such that the respondant and the multiple and distinct users providing consideration to the common request are able to resolve disputes through a neutral third party assigned in the interface through a common agreement between the respondant, and the multiple and distinct users (e.g., using the dispute resolution module 204 of FIG. 2). In operation 1210, it may be designated where the consideration provided by the multiple and distinct users is to be allocated based on a preference of the respondent.

Figure 12A:
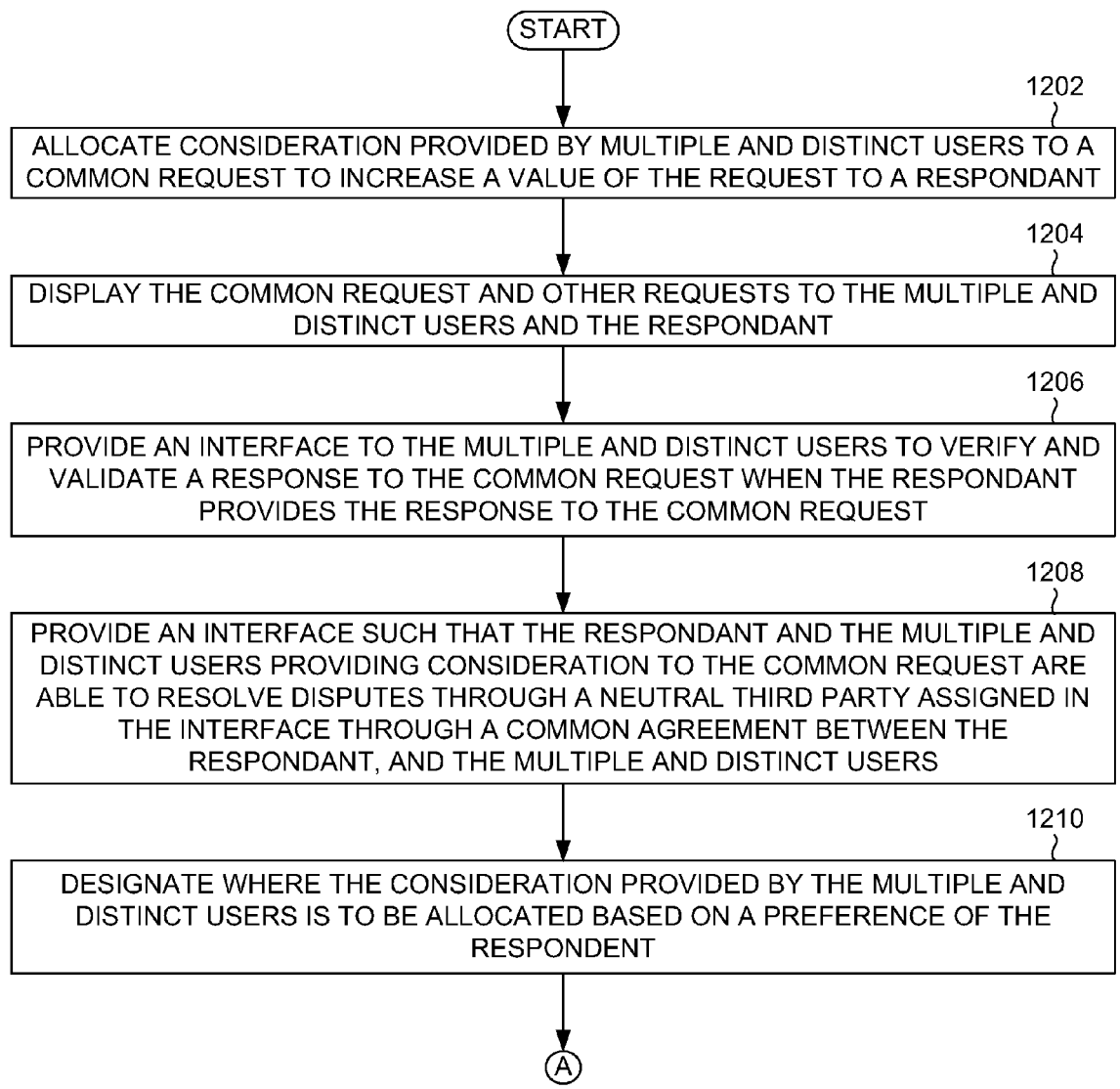
FIGS. 12A and 12B is a process flow of allocating consideration provided by multiple and distinct users to a common request to increase a value of the request to a respondant according to one embodiment.
Figure 12B:
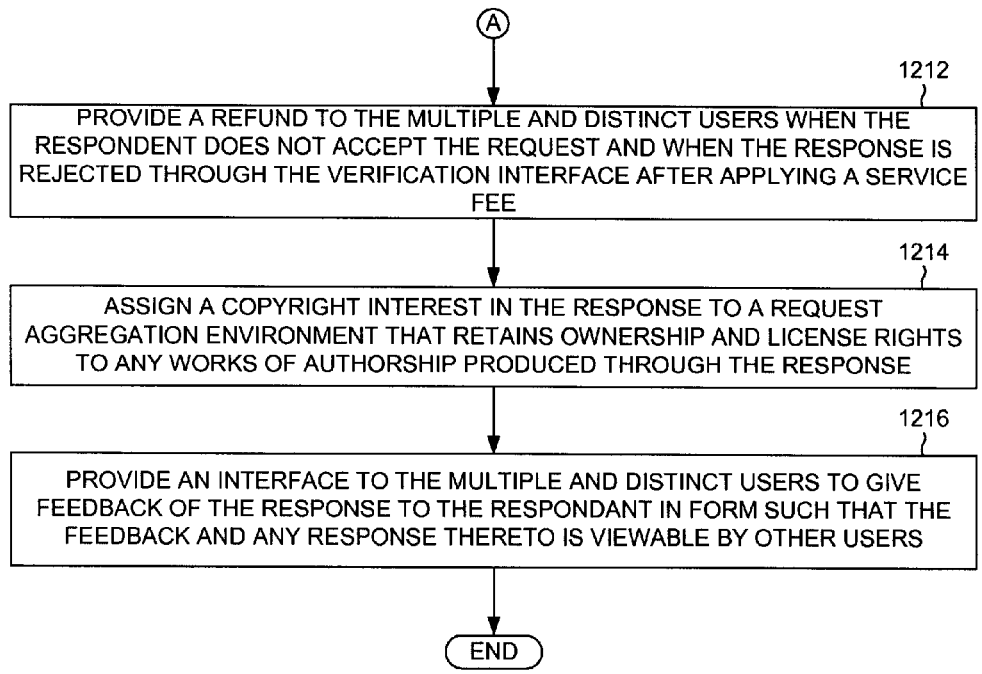

FIG. 12B is a continuation of the process flow of FIG. 12A illustrating additional processes, according to one embodiment. In operation 1212, a refund may be provided to the multiple and distinct users (e.g., using the payment module 212 of FIG. 2) when the respondant does not accept the request and when the response is rejected through the verification interface 202 after applying a service fee. In operation 1214, a copyright interest in the response may be assigned to a request aggregation environment 100 that retains ownership and license rights to any works of authorship produced through the response. In operation 1216, an interface may be provided to the multiple and distinct users to give feedback of the response to the respondant in form such that the feedback and any response thereto is viewable by other users.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the aggregation module 114, the process module 116, the presentation module 118, the validation module 200, the verification interface 202, the dispute resolution module 204, the post module 206, the search module 208, the deadline module 210, the payment module (include payment refund, fee) 212, the copyright management module 214, the pledge module 218, the classification module 220, the public/private module 222, the response module 224, the feedback module 226, the notification and communication module 228, and/or other modules of FIGS. 1-12 may be enabled using an aggregation circuit, a presentation circuit, an process circuit, a validation circuit, a verification circuit, a dispute resolution circuit, a post circuit, a search circuit, a deadline circuit, a payment (include payment refund, fee) circuit, a copyright management circuit, a pledge circuit, a classification circuit, a public/private circuit, a response circuit, a feedback circuit, a notification and communication circuit and/or other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order.

The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:

1. A method, comprising:
generating a request of an entity based on a set of parameters provided by an initiating patron of the entity using a processor of an initiator device;

allocating an initial consideration to a request aggregation environment from the initiating patron;

generating a profile of the request having the initial consideration in the request aggregation environment;

allocating, to the initial consideration, an additional consideration provided when a different patron contributes the additional consideration to the request aggregation environment using a processor of a supporter device;

enabling the initiating patron to submit the request and allocating initial consideration to the entity in the request aggregating environment; and enabling the different patron to contribute the additional consideration to the entity in the request aggregating environment;

allocating the consideration of the initiating patron and the different patron to a common request to increase a value of the request to a respondent;

allocating a service fee to the request aggregation environment when the response is accepted through the verification interface;

providing a refund to the initiating patron and the different patron when the response is rejected through the verification interface after applying the service fee; and permitting a partial fulfillment and redoing of the request by the entity when the initiating patron permits.

2. The method of claim 1 further comprising:

determining whether a contact information of the entity provided by at least one of the initiating patron and the different patron references to a verified contact data; and communicating the request to the entity based on at least one of the contact information and the verified contact data.

3. The method of claim 2 further comprising:

validating the contact information with the entity when the verified contact data is absent; and storing the contact data as the verified contact data.

4. The method of claim 3 further comprising:

generating a summary view of the request and other requests when the initial consideration and the additional consideration exceed a threshold value preferred by the entity in a profile of the entity;

processing a response of the entity to the request;

providing a verification interface to the initiating patron and the different patron;

determining the initial consideration and the additional consideration through at least one account funded through a subscription service and a trusted financial intermediary; and allocating the initial consideration and the additional consideration to the entity based on an initiating patron specified criteria specified prior to the response of the entity to the request.

5. The method of claim 4 further comprising:

setting the criteria as at least one of a weighted preference based on consideration provided to the request, and an equal preference based on a number of patrons providing any consideration to the request;

storing a voting record in the profile of at least one of the initiating patron and the different patron;

arbitrating disputes between patrons and the entity through the verification interface by involving a neutral third party in the verification interface;

automatically accepting the request on behalf of the entity when the threshold value is exceeded;

designating where the initial consideration and the additional consideration is to be allocated based on a preference of the entity; and enabling the initiating patron and the different patron to provide to the entity a feedback to the response.

6. The method of claim 5:

wherein the entity is at least one an individual, a group, a business, a celebrity, and an organization, and wherein the request is at least one of a performance request, a task request, a job request, an article request, a charitable request, an interview, a question to answer, an invitation, a self promotion, a donation request, a mission, and an altruistic request.

7. The method of claim 1 further comprising:

grouping the request and the multiple requests in categories searchable in any number of dimensions;

enabling the initiating patron and the different patron to allocate tasks to the request based on a set of permissions authorized by the initiating patron;

setting a minimum pledge amount and a set of deadlines to the request based on the set of permissions; and accepting additional information associated with the request and a response to the request by the entity in any multimedia format.

8. The method of claim 7 wherein the set of deadlines includes a first deadline to provide the additional consideration, a second deadline to add additional requests when the initiating patron provides for this ability, a third deadline to accept the request, and a fourth deadline to fulfill the request after accepting.

9. The method of claim 1 further comprising:

enabling patrons to designate and search at least one interest in profiles of the patrons;

customizing a set of requests individually displayed to the patrons based on the at least one interest provided in the profiles of the patrons;

forming a group of patrons wherein the group is at least one of a private group accessible only by invitees and a public group that can be subscribed to by any user;

enabling the initiating patron to submit a private request to the entity such the private request is shared only among invitees and the entity; and masking an identity of the initiating patron associated with the private request from the entity.

10. The method of claim 1 further comprising:

allocating a copyright interest in the request and a response to the request by the entity to the request aggregation environment based on an assignment agreement between at least one of the initiating patron, the different patron and the entity with the request aggregation environment;

providing a license to use the copyright interest to the initiating patron, the different patron, and other interested parties; and optionally releasing the copyright interest to at least one of the initiating patron, the different patron, and the entity based on an agreement between the parties.

11. The method of claim 1 in a form of a machine-readable medium embodying a set of instructions that, when executed by a machine, causes the machine to perform the method of claim 1.

12. A method, comprising:

generating a request of an entity based on a set of parameters provided by an initiating patron of the entity using a processor of an initiator device, wherein the entity is at least one an individual, a group, a business, a celebrity, and an organization, wherein the request is at least one of a performance request, a task request, a job request, an article request, a charitable request, an interview, a question to answer, an invitation, a self promotion, a donation request, a mission, and an altruistic request;
allocating an initial consideration to the request aggregation environment from the initiating patron;
enabling the initiating patron and a different patron to create and submit the request to the entity;
generating a profile of the request having the initial consideration in a request aggregation environment;
allocating, to the initial consideration, an additional consideration provided when the different patron contributes the additional consideration to the request aggregation environment using a processor of a supporter device;
enabling the initiating patron to submit the request and allocating initial consideration to the entity in the request aggregating environment;
enabling the different patron to contribute the additional consideration to the entity in the request aggregating environment;
allocating the consideration of the initiating patron and the different patron to a common request to increase a value of the request to a respondent;
allocating a service fee to the request aggregation environment when the response is accepted through the verification interface;
providing a refund to the initiating patron and the different patron when the response is rejected through the verification interface after applying the service fee; and
permitting a partial fulfillment and redoing of the request by the entity when the initiating patron permits.

* * * * *